(12) United States Patent
Sharp et al.

(10) Patent No.: US 8,660,530 B2
(45) Date of Patent: Feb. 25, 2014

(54) REMOTELY RECEIVING AND COMMUNICATING COMMANDS TO A MOBILE DEVICE FOR EXECUTION BY THE MOBILE DEVICE

(75) Inventors: Christopher Brooke Sharp, San Jose, CA (US); Brendan A. McCarthy, San Francisco, CA (US); Stuart Slack, Cupertino, CA (US); Carsten Guenther, San Francisco, CA (US); Jeff Lin, Cupertino, CA (US); Rob Butler, Middletown, DE (US)

(73) Assignee: Apple Inc., Cupertino, CA (US)

( * ) Notice: Subject to any disclaimer, the term of this patent is extended or adjusted under 35 U.S.C. 154(b) by 472 days.

(21) Appl. No.: 12/434,582

(22) Filed: May 1, 2009

(65) Prior Publication Data

US 2010/0279673 A1     Nov. 4, 2010

(51) Int. Cl.
*H04M 3/16*     (2006.01)

(52) U.S. Cl.
USPC ........... 455/411; 455/457; 455/565; 455/419; 705/50; 713/172

(58) Field of Classification Search
USPC .............. 455/410, 411, 418–420, 466, 414.1, 455/404.1
See application file for complete search history.

(56) References Cited

U.S. PATENT DOCUMENTS

| | | | |
|---|---|---|---|
| 4,644,351 A | 2/1987 | Zabarsky et al. |
| 4,903,212 A | 2/1990 | Yokouchi et al. |
| 4,907,159 A | 3/1990 | Mauge et al. |
| 4,999,783 A | 3/1991 | Tenmoku et al. |
| 5,031,104 A | 7/1991 | Ikeda et al. |
| 5,046,011 A | 9/1991 | Kakihara et al. |
| 5,067,081 A | 11/1991 | Person |
| 5,126,941 A | 6/1992 | Gurmu et al. |
| 5,164,904 A | 11/1992 | Sumner |

(Continued)

FOREIGN PATENT DOCUMENTS

| | | |
|---|---|---|
| BR | 9904979 | 12/2000 |
| CA | 2163215 | 5/1994 |

(Continued)

OTHER PUBLICATIONS

Authorized Officer Anita Rothenbucher, International Search Report/Written Opinion in PCT/US2010/033003, mained Jul. 23, 2010, 13 pages (Continued)

*Primary Examiner* — Marcos Batista
*Assistant Examiner* — Keith Fang
(74) *Attorney, Agent, or Firm* — Meyertons, Hood, Kivlin, Kowert & Goetzel, P.C.

(57) ABSTRACT

Methods and systems are presented for remotely commanding a mobile device. In one aspect, a method includes receiving input identifying a mobile device, presenting to a user one or more remote commands corresponding to the mobile device, receiving user input selecting a remote command from the one or more presented remote commands, generating a remote command message instructing the mobile device to execute the selected remote command, and transmitting the remote command message to a server for publication in a message topic. Further, a selectable list of mobile devices associated with a remote management account can be presented to the user, the selectable list including information uniquely identifying each mobile device. Additionally, the selectable list of mobile devices can include an indication of whether an included mobile device is online.

22 Claims, 13 Drawing Sheets

(56) References Cited

U.S. PATENT DOCUMENTS

| | | |
|---|---|---|
| 5,170,165 A | 12/1992 | Iihoshi et al. |
| 5,173,691 A | 12/1992 | Sumner |
| 5,182,555 A | 1/1993 | Sumner |
| 5,187,810 A | 2/1993 | Toneyama et al. |
| 5,195,031 A | 3/1993 | Ordish |
| 5,208,763 A | 5/1993 | Hong et al. |
| 5,218,629 A | 6/1993 | Dumond, Jr. et al. |
| 5,243,652 A | 9/1993 | Teare |
| 5,274,560 A | 12/1993 | LaRue |
| 5,289,572 A | 2/1994 | Yano et al. |
| 5,307,278 A | 4/1994 | Hermans et al. |
| 5,317,311 A | 5/1994 | Martell et al. |
| 5,337,044 A | 8/1994 | Folger et al. |
| 5,339,391 A | 8/1994 | Wroblewski et al. |
| 5,371,678 A | 12/1994 | Nomura |
| 5,374,933 A | 12/1994 | Kao |
| 5,379,057 A | 1/1995 | Clough et al. |
| 5,390,125 A | 2/1995 | Sennott et al. |
| 5,406,490 A | 4/1995 | Braegas |
| 5,416,712 A | 5/1995 | Geier et al. |
| 5,416,890 A | 5/1995 | Beretta |
| 5,469,362 A | 11/1995 | Hunt et al. |
| 5,479,600 A | 12/1995 | Wroblewski et al. |
| 5,504,482 A | 4/1996 | Schreder |
| 5,508,707 A | 4/1996 | LeBlanc et al. |
| 5,510,801 A | 4/1996 | Engelbrecht et al. |
| 5,519,760 A | 5/1996 | Borkowski et al. |
| 5,523,950 A | 6/1996 | Peterson |
| 5,537,460 A | 7/1996 | Holliday, Jr. et al. |
| 5,539,395 A | 7/1996 | Buss |
| 5,539,647 A | 7/1996 | Shibata et al. |
| 5,552,989 A | 9/1996 | Bertrand |
| 5,559,520 A | 9/1996 | Barzegar et al. |
| 5,570,412 A | 10/1996 | LeBlanc |
| 5,598,572 A | 1/1997 | Tanikoshi et al. |
| 5,611,048 A | 3/1997 | Jacobs et al. |
| 5,627,547 A | 5/1997 | Ramaswamy et al. |
| 5,627,549 A | 5/1997 | Park |
| 5,628,050 A | 5/1997 | McGraw |
| 5,630,206 A | 5/1997 | Urban et al. |
| 5,636,245 A | 6/1997 | Ernst |
| 5,642,303 A | 6/1997 | Small |
| 5,646,853 A | 7/1997 | Takahashi et al. |
| 5,654,908 A | 8/1997 | Yokoyama |
| 5,663,732 A | 9/1997 | Stangeland et al. |
| 5,675,362 A | 10/1997 | Clough et al. |
| 5,675,573 A | 10/1997 | Karol et al. |
| 5,677,837 A | 10/1997 | Reynolds |
| 5,684,859 A | 11/1997 | Chanroo et al. |
| 5,689,252 A | 11/1997 | Ayanoglu et al. |
| 5,689,270 A | 11/1997 | Kelley et al. |
| 5,708,478 A | 1/1998 | Tognazzini |
| 5,717,392 A | 2/1998 | Eldridge |
| 5,732,074 A | 3/1998 | Spaur et al. |
| 5,734,978 A | 3/1998 | Hayatake et al. |
| 5,742,666 A | 4/1998 | Alpert |
| 5,745,865 A | 4/1998 | Rostoker et al. |
| 5,748,084 A | 5/1998 | Isikoff |
| 5,748,109 A | 5/1998 | Kosaka et al. |
| 5,752,186 A | 5/1998 | Malackowski et al. |
| 5,754,430 A | 5/1998 | Sawada |
| 5,758,049 A | 5/1998 | Johnson et al. |
| 5,760,773 A | 6/1998 | Berman et al. |
| 5,767,795 A | 6/1998 | Schaphorst |
| 5,774,824 A | 6/1998 | Streit et al. |
| 5,774,829 A | 6/1998 | Cisneros et al. |
| 5,793,630 A | 8/1998 | Theimer |
| 5,796,365 A | 8/1998 | Lewis et al. |
| 5,796,613 A | 8/1998 | Kato et al. |
| 5,806,018 A | 9/1998 | Smith et al. |
| 5,825,306 A | 10/1998 | Hiyokawa et al. |
| 5,825,884 A | 10/1998 | Zdepski et al. |
| 5,831,552 A | 11/1998 | Sogawa et al. |
| 5,835,061 A | 11/1998 | Stewart |
| 5,839,086 A | 11/1998 | Hirano |
| 5,845,227 A | 12/1998 | Peterson |
| 5,848,373 A | 12/1998 | DeLorme et al. |
| 5,862,244 A | 1/1999 | Kleiner et al. |
| 5,867,110 A | 2/1999 | Naito et al. |
| 5,870,686 A | 2/1999 | Monson |
| 5,872,526 A | 2/1999 | Tognazzini |
| 5,873,068 A | 2/1999 | Beaumont et al. |
| 5,883,580 A | 3/1999 | Briancon |
| 5,887,269 A | 3/1999 | Brunts et al. |
| 5,892,454 A | 4/1999 | Schipper et al. |
| 5,893,898 A | 4/1999 | Tanimoto |
| 5,898,680 A | 4/1999 | Johnstone |
| 5,899,954 A | 5/1999 | Sato |
| 5,905,451 A | 5/1999 | Sakashita |
| 5,910,799 A | 6/1999 | Carpenter |
| 5,923,861 A | 7/1999 | Bertram et al. |
| 5,933,094 A | 8/1999 | Goss et al. |
| 5,933,100 A | 8/1999 | Golding |
| 5,936,572 A | 8/1999 | Loomis et al. |
| 5,938,721 A | 8/1999 | Dussell et al. |
| 5,941,930 A | 8/1999 | Morimoto et al. |
| 5,941,934 A | 8/1999 | Sato |
| 5,946,618 A | 8/1999 | Agre et al. |
| 5,948,040 A | 9/1999 | DeLorme et al. |
| 5,948,041 A | 9/1999 | Abo et al. |
| 5,948,061 A | 9/1999 | Merriman et al. |
| 5,955,973 A | 9/1999 | Anderson |
| 5,959,577 A | 9/1999 | Fan |
| 5,959,580 A | 9/1999 | Maloney et al. |
| 5,968,109 A | 10/1999 | Israni et al. |
| 5,969,678 A | 10/1999 | Stewart |
| 5,982,298 A | 11/1999 | Lappenbusch et al. |
| 5,982,324 A | 11/1999 | Watters et al. |
| 5,987,381 A | 11/1999 | Oshizawa |
| 5,991,692 A | 11/1999 | Spencer, II et al. |
| 5,999,126 A | 12/1999 | Ito |
| 6,002,932 A | 12/1999 | Kingdon et al. |
| 6,002,936 A | 12/1999 | Roel-Ng et al. |
| 6,005,928 A | 12/1999 | Johnson |
| 6,014,090 A | 1/2000 | Rosen et al. |
| 6,014,607 A | 1/2000 | Yagyu et al. |
| 6,023,653 A | 2/2000 | Ichimura et al. |
| 6,026,375 A | 2/2000 | Hall et al. |
| 6,028,550 A | 2/2000 | Froeberg et al. |
| 6,029,069 A | 2/2000 | Takaki |
| 6,031,490 A | 2/2000 | Forssen et al. |
| 6,041,280 A | 3/2000 | Kohli et al. |
| 6,052,645 A | 4/2000 | Harada |
| 6,058,350 A | 5/2000 | Ihara |
| 6,064,335 A | 5/2000 | Eschenbach |
| 6,067,502 A | 5/2000 | Hayashida et al. |
| 6,069,570 A | 5/2000 | Herring |
| 6,073,013 A | 6/2000 | Agre et al. |
| 6,073,062 A | 6/2000 | Hoshino et al. |
| 6,076,041 A | 6/2000 | Watanabe |
| 6,078,818 A | 6/2000 | Kingdon et al. |
| 6,081,206 A | 6/2000 | Kielland |
| 6,085,090 A | 7/2000 | Yee et al. |
| 6,085,148 A | 7/2000 | Jamison |
| 6,087,965 A | 7/2000 | Murphy |
| 6,088,594 A | 7/2000 | Kingdon et al. |
| 6,091,956 A | 7/2000 | Hollenberg |
| 6,091,957 A | 7/2000 | Larkins |
| 6,092,076 A | 7/2000 | McDonough et al. |
| 6,094,607 A | 7/2000 | Diesel |
| 6,101,443 A | 8/2000 | Kato |
| 6,104,931 A | 8/2000 | Havinis et al. |
| 6,108,555 A | 8/2000 | Maloney et al. |
| 6,111,541 A | 8/2000 | Karmel |
| 6,115,611 A | 9/2000 | Kimoto et al. |
| 6,115,754 A | 9/2000 | Landgren |
| 6,119,014 A | 9/2000 | Alperovich et al. |
| 6,122,520 A | 9/2000 | Want et al. |
| 6,125,279 A | 9/2000 | Hyziak et al. |
| 6,127,945 A | 10/2000 | Mura-Smith |
| 6,128,482 A | 10/2000 | Nixon et al. |
| 6,128,571 A | 10/2000 | Ito et al. |
| 6,134,548 A | 10/2000 | Gottsman et al. |
| 6,138,003 A | 10/2000 | Kingdon et al. |

(56) References Cited

U.S. PATENT DOCUMENTS

| | | | |
|---|---|---|---|
| 6,138,142 A | 10/2000 | Linsk | |
| 6,140,957 A | 10/2000 | Wilson et al. | |
| 6,151,309 A | 11/2000 | Busuioc et al. | |
| 6,151,498 A | 11/2000 | Roel-Ng et al. | |
| 6,154,152 A | 11/2000 | Ito | |
| 6,157,381 A | 12/2000 | Bates et al. | |
| 6,157,841 A | 12/2000 | Bolduc et al. | |
| 6,163,749 A | 12/2000 | McDonough et al. | |
| 6,166,627 A | 12/2000 | Reeley | |
| 6,167,266 A | 12/2000 | Havinis et al. | |
| 6,169,552 B1 | 1/2001 | Endo et al. | |
| 6,175,740 B1 | 1/2001 | Souissi et al. | |
| 6,177,905 B1 | 1/2001 | Welch | |
| 6,177,938 B1 | 1/2001 | Gould | |
| 6,181,934 B1 | 1/2001 | Havinis et al. | |
| 6,185,427 B1 | 2/2001 | Krasner et al. | |
| 6,188,959 B1 | 2/2001 | Schupfner | |
| 6,195,557 B1 | 2/2001 | Havinis et al. | |
| 6,195,609 B1 | 2/2001 | Pilley et al. | |
| 6,199,014 B1 | 3/2001 | Walker | |
| 6,199,045 B1 | 3/2001 | Giniger et al. | |
| 6,199,099 B1 | 3/2001 | Gershman et al. | |
| 6,202,008 B1 | 3/2001 | Beckert et al. | |
| 6,202,023 B1 | 3/2001 | Hancock et al. | |
| 6,208,866 B1 | 3/2001 | Rouhollahzadeh et al. | |
| 6,212,473 B1 | 4/2001 | Stefan et al. | |
| 6,216,086 B1 | 4/2001 | Seymour et al. | |
| 6,222,483 B1 | 4/2001 | Twitchell et al. | |
| 6,233,518 B1 | 5/2001 | Lee | |
| 6,236,365 B1 | 5/2001 | LeBlanc et al. | |
| 6,236,933 B1 | 5/2001 | Lang | |
| 6,246,948 B1 | 6/2001 | Thakker | |
| 6,249,252 B1 | 6/2001 | Dupray | |
| 6,252,543 B1 | 6/2001 | Camp | |
| 6,252,544 B1 | 6/2001 | Hoffberg | |
| 6,256,498 B1 | 7/2001 | Ludwig | |
| 6,259,405 B1 | 7/2001 | Stewart et al. | |
| 6,266,612 B1 | 7/2001 | Dussell et al. | |
| 6,266,614 B1 | 7/2001 | Alumbaugh | |
| 6,266,615 B1 | 7/2001 | Jin | |
| 6,272,342 B1 | 8/2001 | Havinis et al. | |
| 6,278,884 B1 | 8/2001 | Kim | |
| 6,281,807 B1 | 8/2001 | Kynast et al. | |
| 6,282,491 B1 | 8/2001 | Bochmann et al. | |
| 6,282,496 B1 | 8/2001 | Chowdhary | |
| 6,295,454 B1 | 9/2001 | Havinis et al. | |
| 6,298,306 B1 | 10/2001 | Suarez et al. | |
| 6,304,758 B1 | 10/2001 | Iierbig et al. | |
| 6,313,761 B1 | 11/2001 | Shinada | |
| 6,317,684 B1 | 11/2001 | Roeseler et al. | |
| 6,321,158 B1 | 11/2001 | DeLorme et al. | |
| 6,323,846 B1 | 11/2001 | Westerman et al. | |
| 6,326,918 B1 | 12/2001 | Stewart | |
| 6,332,127 B1 | 12/2001 | Bandera et al. | |
| 6,339,437 B1 | 1/2002 | Nielsen | |
| 6,339,746 B1 | 1/2002 | Sugiyama et al. | |
| 6,343,317 B1 | 1/2002 | Glorikian | |
| 6,345,288 B1 | 2/2002 | Reed et al. | |
| 6,351,235 B1 | 2/2002 | Stilp | |
| 6,353,398 B1 | 3/2002 | Amin et al. | |
| 6,353,743 B1 | 3/2002 | Karmel | |
| 6,353,837 B1 | 3/2002 | Blumenau | |
| 6,356,761 B1 | 3/2002 | Huttunen | |
| 6,356,763 B1 | 3/2002 | Kangas et al. | |
| 6,356,836 B1 | 3/2002 | Adolph | |
| 6,356,838 B1 | 3/2002 | Paul | |
| 6,370,629 B1 | 4/2002 | Hastings et al. | |
| 6,377,886 B1 | 4/2002 | Gotou | |
| 6,381,465 B1 | 4/2002 | Chern et al. | |
| 6,381,539 B1 | 4/2002 | Shimazu | |
| 6,385,458 B1 | 5/2002 | Papadimitriou et al. | |
| 6,385,465 B1 | 5/2002 | Yoshioka | |
| 6,385,535 B2 | 5/2002 | Ohishi et al. | |
| 6,389,288 B1 | 5/2002 | Kuwahara et al. | |
| 6,401,032 B1 | 6/2002 | Jamison | |
| 6,405,034 B1 | 6/2002 | Tijerino | |
| 6,405,123 B1 | 6/2002 | Rennar et al. | |
| 6,411,899 B2 | 6/2002 | Dussell et al. | |
| 6,414,635 B1 | 7/2002 | Stewart et al. | |
| 6,415,207 B1 | 7/2002 | Jones | |
| 6,415,220 B1 | 7/2002 | Kovacs | |
| 6,415,227 B1 | 7/2002 | Lin | |
| 6,427,115 B1 | 7/2002 | Sekiyama | |
| 6,430,411 B1 | 8/2002 | Lempio et al. | |
| 6,438,490 B2 | 8/2002 | Ohta | |
| 6,449,485 B1 | 9/2002 | Anzil | |
| 6,452,498 B2 | 9/2002 | Stewart | |
| 6,456,234 B1 | 9/2002 | Johnson | |
| 6,456,956 B1 | 9/2002 | Xiong | |
| 6,459,782 B1 | 10/2002 | Bedrosian et al. | |
| 6,463,289 B1 | 10/2002 | Havinis et al. | |
| 6,477,581 B1 | 11/2002 | Carpenter | |
| 6,487,305 B2 | 11/2002 | Kambe et al. | |
| 6,490,454 B1 | 12/2002 | Kangas et al. | |
| 6,490,519 B1 | 12/2002 | Lapidot et al. | |
| 6,501,421 B1 | 12/2002 | Dutta et al. | |
| 6,505,046 B1 | 1/2003 | Baker | |
| 6,505,048 B1 | 1/2003 | Moles et al. | |
| 6,505,123 B1 | 1/2003 | Root et al. | |
| 6,507,802 B1 | 1/2003 | Payton et al. | |
| 6,516,197 B2 | 2/2003 | Havinis et al. | |
| 6,519,463 B2 | 2/2003 | Tendler | |
| 6,526,335 B1 | 2/2003 | Treyz et al. | |
| 6,529,143 B2 | 3/2003 | Mikkola et al. | |
| 6,535,140 B1 | 3/2003 | Goss et al. | |
| 6,542,812 B1 | 4/2003 | Obradovich et al. | |
| 6,542,819 B1 | 4/2003 | Kovacs et al. | |
| 6,546,360 B1 | 4/2003 | Gilbert et al. | |
| 6,552,682 B1 | 4/2003 | Fan | |
| 6,563,430 B1 | 5/2003 | Kemink et al. | |
| 6,564,143 B1 | 5/2003 | Alewine et al. | |
| 6,570,557 B1 | 5/2003 | Westerman et al. | |
| 6,571,279 B1 | 5/2003 | Herz et al. | |
| 6,574,484 B1 | 6/2003 | Carley | |
| 6,587,688 B1 | 7/2003 | Chambers et al. | |
| 6,587,782 B1 | 7/2003 | Nocek et al. | |
| 6,587,835 B1 | 7/2003 | Treyz et al. | |
| 6,594,480 B1 | 7/2003 | Montalvo et al. | |
| 6,597,305 B2 | 7/2003 | Szeto et al. | |
| 6,611,687 B1 | 8/2003 | Clark et al. | |
| 6,611,788 B1 | 8/2003 | Hussa | |
| 6,615,131 B1 | 9/2003 | Rennard et al. | |
| 6,615,213 B1 | 9/2003 | Johnson | |
| 6,647,257 B2 | 11/2003 | Owensby | |
| 6,650,902 B1 | 11/2003 | Richton | |
| 6,650,997 B2 | 11/2003 | Funk | |
| 6,662,023 B1 * | 12/2003 | Helle | 455/558 |
| 6,667,963 B1 | 12/2003 | Rantalainen et al. | |
| 6,671,377 B1 | 12/2003 | Havinis et al. | |
| 6,674,849 B1 | 1/2004 | Froeberg | |
| 6,677,894 B2 | 1/2004 | Sheynblat et al. | |
| 6,679,932 B2 | 1/2004 | Birler et al. | |
| 6,680,694 B1 | 1/2004 | Knockeart et al. | |
| 6,681,120 B1 | 1/2004 | Kim | |
| 6,683,538 B1 | 1/2004 | Wilkes, Jr. | |
| 6,697,018 B2 | 2/2004 | Stewart | |
| 6,697,734 B1 | 2/2004 | Suomela | |
| 6,711,408 B1 | 3/2004 | Raith | |
| 6,711,474 B1 | 3/2004 | Treyz et al. | |
| 6,721,572 B1 | 4/2004 | Smith et al. | |
| 6,731,236 B1 | 5/2004 | Hager et al. | |
| 6,731,238 B2 | 5/2004 | Johnson | |
| 6,738,808 B1 | 5/2004 | Zellner et al. | |
| 6,741,188 B1 | 5/2004 | Miller et al. | |
| 6,741,926 B1 | 5/2004 | Zhao et al. | |
| 6,748,226 B1 | 6/2004 | Wortham | |
| 6,750,883 B1 | 6/2004 | Parupudi et al. | |
| 6,759,960 B2 | 7/2004 | Stewart | |
| 6,766,174 B1 | 7/2004 | Kenyon | |
| 6,782,278 B2 | 8/2004 | Chen et al. | |
| 6,789,012 B1 | 9/2004 | Childs et al. | |
| 6,795,686 B2 | 9/2004 | Master et al. | |
| 6,801,855 B1 | 10/2004 | Walters et al. | |
| 6,810,323 B1 | 10/2004 | Bullock et al. | |

(56) References Cited

U.S. PATENT DOCUMENTS

| | | |
|---|---|---|
| 6,813,501 B2 | 11/2004 | Kinnunen et al. |
| 6,813,503 B1 | 11/2004 | Zillikens et al. |
| 6,816,782 B1 | 11/2004 | Walters et al. |
| 6,819,919 B1 | 11/2004 | Tanaka |
| 6,823,188 B1 | 11/2004 | Stern |
| 6,845,318 B1 | 1/2005 | Moore et al. |
| 6,847,891 B2 | 1/2005 | Pietras et al. |
| 6,853,911 B1 | 2/2005 | Sakarya |
| 6,853,917 B2 | 2/2005 | Miwa |
| 6,859,149 B1 | 2/2005 | Ohta et al. |
| 6,865,483 B1 | 3/2005 | Cook, III et al. |
| 6,868,074 B1 | 3/2005 | Hanson |
| 6,871,144 B1 | 3/2005 | Lee |
| 6,882,313 B1 | 4/2005 | Fan et al. |
| 6,888,536 B2 | 5/2005 | Westerman et al. |
| 6,909,902 B1 | 6/2005 | Sawada et al. |
| 6,912,398 B1 | 6/2005 | Domnitz |
| 6,914,626 B2 | 7/2005 | Squibbs |
| 6,915,208 B2 | 7/2005 | Garin et al. |
| 6,933,841 B2 | 8/2005 | Muramatsu et al. |
| 6,944,447 B2 | 9/2005 | Portman et al. |
| 6,948,656 B2 | 9/2005 | Williams |
| 6,954,646 B2 | 10/2005 | Churt |
| 6,954,735 B1 | 10/2005 | Djupsjobacka et al. |
| 6,957,072 B2 | 10/2005 | Kangras et al. |
| 6,975,959 B2 | 12/2005 | Dietrich et al. |
| 6,980,909 B2 | 12/2005 | Root et al. |
| 6,990,495 B1 | 1/2006 | Grason et al. |
| 6,999,779 B1 | 2/2006 | Hashimoto |
| 7,003,289 B1 | 2/2006 | Kolls |
| 7,009,556 B2 | 3/2006 | Stewart |
| 7,031,725 B2 | 4/2006 | Rorabaugh |
| 7,044,372 B2 | 5/2006 | Okuda et al. |
| 7,058,594 B2 | 6/2006 | Stewart |
| 7,076,255 B2 | 7/2006 | Parupudi et al. |
| 7,089,264 B1 | 8/2006 | Guido et al. |
| 7,096,029 B1 | 8/2006 | Parupudi et al. |
| 7,096,030 B2 | 8/2006 | Huomo |
| 7,103,470 B2 | 9/2006 | Mintz |
| 7,117,015 B2 | 10/2006 | Scheinert et al. |
| 7,120,469 B1 | 10/2006 | Urakawa |
| 7,123,189 B2 | 10/2006 | Lalik et al. |
| 7,123,926 B2 | 10/2006 | Himmelstein |
| 7,146,298 B2 | 12/2006 | Motamedi et al. |
| 7,151,921 B2 | 12/2006 | Otsuka |
| 7,165,725 B2 | 1/2007 | Casey |
| 7,171,190 B2 | 1/2007 | Ye et al. |
| 7,181,189 B2 | 2/2007 | Hotta et al. |
| 7,187,997 B2 | 3/2007 | Johnson |
| 7,200,409 B1 | 4/2007 | Ichikawa et al. |
| 7,200,566 B1 | 4/2007 | Moore et al. |
| 7,213,048 B1 | 5/2007 | Parupudi et al. |
| 7,215,967 B1 | 5/2007 | Kransmo et al. |
| 7,236,883 B2 | 6/2007 | Garin et al. |
| 7,254,481 B2 | 8/2007 | Yamada et al. |
| 7,256,711 B2 | 8/2007 | Sheha et al. |
| 7,257,392 B2 | 8/2007 | Tang et al. |
| 7,260,378 B2 | 8/2007 | Holland et al. |
| 7,266,376 B2 | 9/2007 | Nakagawa |
| 7,269,601 B2 | 9/2007 | Kinno et al. |
| 7,271,765 B2 | 9/2007 | Stilp et al. |
| 7,272,404 B2 | 9/2007 | Overy et al. |
| 7,274,332 B1 | 9/2007 | Dupray |
| 7,274,939 B2 | 9/2007 | Ruutu et al. |
| 7,280,822 B2 | 10/2007 | Fraccaroli |
| 7,295,556 B2 | 11/2007 | Roese et al. |
| 7,295,925 B2 | 11/2007 | Breed et al. |
| 7,299,008 B2 | 11/2007 | Gluck |
| 7,310,516 B1 | 12/2007 | Vacanti |
| 7,313,467 B2 | 12/2007 | Breed et al. |
| 7,319,412 B1 | 1/2008 | Coppinger et al. |
| 7,336,949 B2 | 2/2008 | Nasielski |
| 7,339,496 B2 | 3/2008 | Endo et al. |
| 7,343,564 B2 | 3/2008 | Othmer |
| 7,349,706 B2 | 3/2008 | Kim et al. |
| 7,359,713 B1 | 4/2008 | Tiwari |
| 7,370,283 B2 | 5/2008 | Othmer |
| 7,373,246 B2 | 5/2008 | O'Clair |
| 7,386,396 B2 | 6/2008 | Johnson |
| 7,389,179 B2 | 6/2008 | Jin et al. |
| 7,392,017 B2 | 6/2008 | Chu et al. |
| 7,395,031 B1 | 7/2008 | Ritter |
| 7,418,402 B2 | 8/2008 | McCrossin et al. |
| 7,421,422 B1 | 9/2008 | Dempster et al. |
| 7,421,486 B1 | 9/2008 | Parupudi et al. |
| 7,426,437 B2 | 9/2008 | Breed et al. |
| 7,433,694 B2 | 10/2008 | Morgan et al. |
| 7,440,842 B1 | 10/2008 | Vorona |
| 7,466,235 B1 | 12/2008 | Kolb et al. |
| 7,483,944 B2 | 1/2009 | Parupudi et al. |
| 7,486,201 B2 | 2/2009 | Kelly et al. |
| 7,500,607 B2 | 3/2009 | Williams |
| 7,512,487 B1 | 3/2009 | Golding et al. |
| 7,522,927 B2 | 4/2009 | Fitch et al. |
| 7,545,281 B2 | 6/2009 | Richards et al. |
| 7,558,696 B2 | 7/2009 | Vilppula et al. |
| 7,565,132 B2 | 7/2009 | Ben Ayed |
| 7,565,157 B1 | 7/2009 | Ortega et al. |
| 7,574,222 B2 | 8/2009 | Sawada et al. |
| 7,577,448 B2 | 8/2009 | Pande et al. |
| 7,587,345 B2 | 9/2009 | Mann et al. |
| 7,593,991 B2 | 9/2009 | Friedman et al. |
| 7,599,795 B1 | 10/2009 | Blumberg et al. |
| 7,603,233 B2 | 10/2009 | Tashiro |
| 7,606,580 B2 | 10/2009 | Granito et al. |
| 7,617,044 B2 | 11/2009 | Lee |
| 7,620,404 B2 | 11/2009 | Chesnais et al. |
| 7,623,848 B2 | 11/2009 | Rosenfelt et al. |
| 7,624,358 B2 | 11/2009 | Kim et al. |
| 7,647,174 B2 | 1/2010 | Kwon |
| 7,680,591 B2 | 3/2010 | Nagata et al. |
| 7,689,916 B1 | 3/2010 | Goel et al. |
| 7,710,290 B2 | 5/2010 | Johnson |
| 7,711,478 B2 | 5/2010 | Gluck |
| 7,714,778 B2 | 5/2010 | Dupray |
| 7,739,040 B2 | 6/2010 | Horvitz |
| 7,743,074 B1 | 6/2010 | Parupudi et al. |
| 7,756,639 B2 | 7/2010 | Colley et al. |
| 7,768,395 B2 | 8/2010 | Gold |
| 7,792,273 B2 | 9/2010 | Fano et al. |
| 7,811,203 B2 | 10/2010 | Unuma et al. |
| 7,817,033 B2 | 10/2010 | Motoyama |
| 7,848,388 B2 | 12/2010 | Tudosoiu |
| 7,848,765 B2 | 12/2010 | Phillips et al. |
| 7,860,758 B2 | 12/2010 | McCrossin et al. |
| 7,890,123 B2 | 2/2011 | Granito et al. |
| 7,933,612 B2 | 4/2011 | Counts et al. |
| 7,933,929 B1 | 4/2011 | McClendon et al. |
| 7,979,350 B1 | 7/2011 | Carion |
| 8,036,630 B2 | 10/2011 | Park et al. |
| 8,036,634 B2 | 10/2011 | DiMeo et al. |
| 8,046,009 B2 | 10/2011 | Bodmer et al. |
| 8,361,166 B2 | 1/2013 | Bhansali et al. |
| 2001/0018349 A1 | 8/2001 | Kinnunen et al. |
| 2001/0046884 A1 | 11/2001 | Yoshioka |
| 2002/0032035 A1 | 3/2002 | Teshima |
| 2002/0035493 A1 | 3/2002 | Mozayeny et al. |
| 2002/0035609 A1 | 3/2002 | Lessard et al. |
| 2002/0042266 A1 | 4/2002 | Heyward et al. |
| 2002/0046069 A1 | 4/2002 | Mozayeny et al. |
| 2002/0046077 A1 | 4/2002 | Mozayeny et al. |
| 2002/0046084 A1 | 4/2002 | Steele et al. |
| 2002/0067353 A1 | 6/2002 | Kenyon et al. |
| 2002/0077144 A1 | 6/2002 | Keller et al. |
| 2002/0087505 A1 | 7/2002 | Smith et al. |
| 2002/0091991 A1 | 7/2002 | Castro |
| 2002/0095486 A1 | 7/2002 | Bahl |
| 2002/0126146 A1 | 9/2002 | Burns et al. |
| 2002/0128773 A1 | 9/2002 | Chowanic et al. |
| 2002/0132625 A1 | 9/2002 | Ogino et al. |
| 2002/0140560 A1 | 10/2002 | Altman et al. |
| 2002/0160815 A1 | 10/2002 | Patel et al. |
| 2002/0167442 A1 | 11/2002 | Taylor |
| 2002/0173905 A1 | 11/2002 | Jin et al. |

(56) References Cited

U.S. PATENT DOCUMENTS

| | | |
|---|---|---|
| 2003/0013491 A1 | 1/2003 | Moriki |
| 2003/0014181 A1 | 1/2003 | Myr |
| 2003/0016804 A1 | 1/2003 | Sheha et al. |
| 2003/0032404 A1 | 2/2003 | Wager et al. |
| 2003/0055560 A1 | 3/2003 | Phillips |
| 2003/0060212 A1 | 3/2003 | Thomas |
| 2003/0060215 A1 | 3/2003 | Graham |
| 2003/0060973 A1 | 3/2003 | Mathews et al. |
| 2003/0060976 A1 | 3/2003 | Sato et al. |
| 2003/0065934 A1 | 4/2003 | Angelo et al. |
| 2003/0069683 A1 | 4/2003 | Lapidot et al. |
| 2003/0078054 A1 | 4/2003 | Okuda |
| 2003/0078055 A1 | 4/2003 | Smith et al. |
| 2003/0078057 A1 | 4/2003 | Watanabe et al. |
| 2003/0093217 A1 | 5/2003 | Petzold et al. |
| 2003/0096620 A1 | 5/2003 | Ozturk et al. |
| 2003/0100326 A1 | 5/2003 | Grube et al. |
| 2003/0100334 A1 | 5/2003 | Mazzara, Jr. |
| 2003/0101225 A1 | 5/2003 | Han et al. |
| 2003/0134657 A1 | 7/2003 | Norta et al. |
| 2003/0140136 A1 | 7/2003 | Nakamura |
| 2003/0144793 A1 | 7/2003 | Melaku et al. |
| 2003/0148774 A1 | 8/2003 | Naghian et al. |
| 2003/0158655 A1 | 8/2003 | Obradovich et al. |
| 2003/0191578 A1 | 10/2003 | Paulauskas et al. |
| 2003/0236106 A1 | 12/2003 | Master et al. |
| 2004/0010358 A1 | 1/2004 | Oesterling et al. |
| 2004/0036649 A1 | 2/2004 | Taylor |
| 2004/0054428 A1 | 3/2004 | Sheha et al. |
| 2004/0059502 A1 | 3/2004 | Levi et al. |
| 2004/0068439 A1 | 4/2004 | Elgrably |
| 2004/0072577 A1 | 4/2004 | Myllymaki et al. |
| 2004/0073361 A1 | 4/2004 | Tzamaloukas et al. |
| 2004/0082351 A1 | 4/2004 | Westman |
| 2004/0083050 A1 | 4/2004 | Biyani |
| 2004/0093155 A1 | 5/2004 | Simonds |
| 2004/0104842 A1 | 6/2004 | Drury et al. |
| 2004/0128067 A1 | 7/2004 | Smith |
| 2004/0151151 A1 | 8/2004 | Kubler et al. |
| 2004/0158401 A1 | 8/2004 | Yoon |
| 2004/0158584 A1 | 8/2004 | Necsoiu et al. |
| 2004/0172409 A1 | 9/2004 | James |
| 2004/0176907 A1 | 9/2004 | Nesbitt |
| 2004/0180669 A1 | 9/2004 | Kall |
| 2004/0192299 A1 | 9/2004 | Wilson et al. |
| 2004/0198335 A1 | 10/2004 | Campen |
| 2004/0198379 A1 | 10/2004 | Magee et al. |
| 2004/0198397 A1 | 10/2004 | Weiss |
| 2004/0203569 A1 | 10/2004 | Jijina et al. |
| 2004/0203746 A1 | 10/2004 | Knauerhase et al. |
| 2004/0203836 A1 | 10/2004 | Gorday et al. |
| 2004/0203880 A1 | 10/2004 | Riley |
| 2004/0203909 A1 | 10/2004 | Koster |
| 2004/0215707 A1 | 10/2004 | Fujita et al. |
| 2004/0225436 A1 | 11/2004 | Yoshihashi |
| 2004/0228330 A1 | 11/2004 | Kubler et al. |
| 2004/0236504 A1 | 11/2004 | Bickford et al. |
| 2004/0242149 A1 | 12/2004 | Luneau |
| 2004/0246940 A1 | 12/2004 | Kubler et al. |
| 2004/0248562 A1 | 12/2004 | Kim |
| 2004/0248586 A1 | 12/2004 | Patel et al. |
| 2004/0260939 A1 | 12/2004 | Ichikawa et al. |
| 2004/0263084 A1 | 12/2004 | Mor et al. |
| 2004/0264442 A1 | 12/2004 | Kubler et al. |
| 2005/0002419 A1 | 1/2005 | Doviak et al. |
| 2005/0004838 A1 | 1/2005 | Perkowski et al. |
| 2005/0009511 A1 | 1/2005 | Bostrom et al. |
| 2005/0027442 A1 | 2/2005 | Kelley et al. |
| 2005/0033515 A1 | 2/2005 | Bozzone |
| 2005/0037781 A1 | 2/2005 | Ozugur et al. |
| 2005/0039140 A1 | 2/2005 | Chen |
| 2005/0046584 A1 | 3/2005 | Breed |
| 2005/0071078 A1 | 3/2005 | Yamada et al. |
| 2005/0071702 A1 | 3/2005 | Morisawa |
| 2005/0075116 A1 | 4/2005 | Laird |
| 2005/0085272 A1 | 4/2005 | Anderson et al. |
| 2005/0091408 A1 | 4/2005 | Parupudi et al. |
| 2005/0096840 A1 | 5/2005 | Simske |
| 2005/0114021 A1 | 5/2005 | Krull et al. |
| 2005/0130677 A1 | 6/2005 | Meunier et al. |
| 2005/0134440 A1 | 6/2005 | Breed |
| 2005/0134578 A1 | 6/2005 | Chambers et al. |
| 2005/0149250 A1 | 7/2005 | Isaac |
| 2005/0153681 A1 | 7/2005 | Hanson |
| 2005/0176411 A1 | 8/2005 | Taya |
| 2005/0186954 A1 | 8/2005 | Kenney |
| 2005/0192025 A1 | 9/2005 | Kaplan |
| 2005/0197767 A1 | 9/2005 | Nortrup |
| 2005/0203698 A1 | 9/2005 | Lee |
| 2005/0221799 A1 | 10/2005 | Tervo et al. |
| 2005/0221808 A1 | 10/2005 | Karlsson et al. |
| 2005/0221843 A1 | 10/2005 | Friedman et al. |
| 2005/0222756 A1 | 10/2005 | Davis et al. |
| 2005/0222763 A1 | 10/2005 | Uyeki |
| 2005/0227709 A1 | 10/2005 | Chang et al. |
| 2005/0228860 A1 | 10/2005 | Hamynen et al. |
| 2005/0234637 A1 | 10/2005 | Obradovich et al. |
| 2005/0239477 A1 | 10/2005 | Kim et al. |
| 2005/0250440 A1 | 11/2005 | Zhou et al. |
| 2005/0256639 A1 | 11/2005 | Aleksic et al. |
| 2005/0286421 A1 | 12/2005 | Janacek |
| 2006/0009908 A1 | 1/2006 | Tomita et al. |
| 2006/0015249 A1 | 1/2006 | Gieseke |
| 2006/0022048 A1 | 2/2006 | Johnson |
| 2006/0038719 A1 | 2/2006 | Pande et al. |
| 2006/0041374 A1 | 2/2006 | Inoue |
| 2006/0041377 A1 | 2/2006 | Jung et al. |
| 2006/0041378 A1 | 2/2006 | Cheng et al. |
| 2006/0056388 A1 | 3/2006 | Livingood |
| 2006/0058955 A1 | 3/2006 | Mehren |
| 2006/0063539 A1 | 3/2006 | Beyer, Jr. |
| 2006/0069503 A1 | 3/2006 | Suomela |
| 2006/0085392 A1 | 4/2006 | Wang et al. |
| 2006/0094353 A1 | 5/2006 | Nielsen et al. |
| 2006/0101005 A1 | 5/2006 | Yang et al. |
| 2006/0111122 A1 | 5/2006 | Carlson et al. |
| 2006/0116137 A1 | 6/2006 | Jung |
| 2006/0148463 A1 | 7/2006 | Zhu et al. |
| 2006/0149461 A1 | 7/2006 | Rowley |
| 2006/0150119 A1 | 7/2006 | Chesnais et al. |
| 2006/0166679 A1 | 7/2006 | Karaoguz et al. |
| 2006/0168300 A1 | 7/2006 | An et al. |
| 2006/0172769 A1 | 8/2006 | Oh |
| 2006/0172778 A1 | 8/2006 | Sundararajan et al. |
| 2006/0179114 A1 | 8/2006 | Deeds |
| 2006/0180649 A1 | 8/2006 | Casey |
| 2006/0184978 A1 | 8/2006 | Casey |
| 2006/0195481 A1 | 8/2006 | Arrouye et al. |
| 2006/0199567 A1 | 9/2006 | Alston |
| 2006/0202819 A1 | 9/2006 | Adamczyk et al. |
| 2006/0211453 A1 | 9/2006 | Schick |
| 2006/0227047 A1 | 10/2006 | Rosenberg |
| 2006/0229802 A1 | 10/2006 | Vertelney et al. |
| 2006/0247855 A1 | 11/2006 | de Silva et al. |
| 2006/0251034 A1 | 11/2006 | Park |
| 2006/0270421 A1 | 11/2006 | Phillips et al. |
| 2006/0271280 A1 | 11/2006 | O'Clair |
| 2006/0284767 A1 | 12/2006 | Taylor |
| 2006/0287824 A1 | 12/2006 | Lin |
| 2006/0291639 A1 | 12/2006 | Radziewicz et al. |
| 2006/0293029 A1 | 12/2006 | Jha et al. |
| 2006/0293083 A1 | 12/2006 | Bowen |
| 2007/0001875 A1 | 1/2007 | Taylor |
| 2007/0003040 A1 | 1/2007 | Radziewicz et al. |
| 2007/0005118 A1 | 1/2007 | Johnson |
| 2007/0005188 A1 | 1/2007 | Johnson |
| 2007/0005233 A1 | 1/2007 | Pinkus et al. |
| 2007/0006098 A1 | 1/2007 | Krumm et al. |
| 2007/0008515 A1 | 1/2007 | Otani et al. |
| 2007/0010942 A1 | 1/2007 | Bill |
| 2007/0016362 A1 | 1/2007 | Nelson |
| 2007/0027614 A1 | 2/2007 | Reeser et al. |
| 2007/0027628 A1 | 2/2007 | Geelen |
| 2007/0042790 A1 | 2/2007 | Mohi et al. |

(56) References Cited

U.S. PATENT DOCUMENTS

| | | |
|---|---|---|
| 2007/0055684 A1 | 3/2007 | Stevens |
| 2007/0061245 A1 | 3/2007 | Ramer et al. |
| 2007/0061301 A1 | 3/2007 | Ramer et al. |
| 2007/0061363 A1 | 3/2007 | Ramer et al. |
| 2007/0071114 A1 | 3/2007 | Sanderford et al. |
| 2007/0073480 A1 | 3/2007 | Singh |
| 2007/0073719 A1 | 3/2007 | Ramer et al. |
| 2007/0087726 A1 | 4/2007 | McGary et al. |
| 2007/0093258 A1 | 4/2007 | Steenstra et al. |
| 2007/0106465 A1 | 5/2007 | Adam et al. |
| 2007/0124043 A1 | 5/2007 | Ayoub et al. |
| 2007/0124058 A1 | 5/2007 | Kitagawa et al. |
| 2007/0124066 A1 | 5/2007 | Kikuchi |
| 2007/0124759 A1 | 5/2007 | Yokoyama et al. |
| 2007/0127661 A1 | 6/2007 | Didcock |
| 2007/0129888 A1 | 6/2007 | Rosenberg |
| 2007/0130153 A1 | 6/2007 | Nachman et al. |
| 2007/0135136 A1 | 6/2007 | Ische |
| 2007/0135990 A1 | 6/2007 | Seymour et al. |
| 2007/0142026 A1 | 6/2007 | Kuz et al. |
| 2007/0149212 A1 | 6/2007 | Gupta et al. |
| 2007/0150320 A1 | 6/2007 | Huang |
| 2007/0153983 A1 | 7/2007 | Bloebaum et al. |
| 2007/0153984 A1 | 7/2007 | Bloebaum et al. |
| 2007/0153986 A1 | 7/2007 | Bloebaum et al. |
| 2007/0155360 A1 | 7/2007 | An |
| 2007/0156326 A1 | 7/2007 | Nesbitt |
| 2007/0179854 A1 | 8/2007 | Ziv et al. |
| 2007/0184855 A1 | 8/2007 | Klassen |
| 2007/0190995 A1* | 8/2007 | Wang et al. .................. 455/419 |
| 2007/0191029 A1 | 8/2007 | Zarem et al. |
| 2007/0200713 A1 | 8/2007 | Weber et al. |
| 2007/0204218 A1 | 8/2007 | Weber et al. |
| 2007/0206730 A1 | 9/2007 | Polk |
| 2007/0208492 A1 | 9/2007 | Downs et al. |
| 2007/0208497 A1 | 9/2007 | Downs et al. |
| 2007/0208498 A1 | 9/2007 | Barker et al. |
| 2007/0218925 A1* | 9/2007 | Islam et al. .................. 455/466 |
| 2007/0219706 A1 | 9/2007 | Sheynblat |
| 2007/0229549 A1 | 10/2007 | Dicke et al. |
| 2007/0232272 A1* | 10/2007 | Gonsalves et al. ......... 455/412.1 |
| 2007/0232326 A1 | 10/2007 | Johnson |
| 2007/0233387 A1 | 10/2007 | Johnson |
| 2007/0238491 A1 | 10/2007 | He |
| 2007/0243853 A1 | 10/2007 | Bumiller et al. |
| 2007/0247435 A1 | 10/2007 | Benko et al. |
| 2007/0254676 A1 | 11/2007 | Pedigo et al. |
| 2007/0259674 A1 | 11/2007 | Neef et al. |
| 2007/0260751 A1 | 11/2007 | Meesseman |
| 2007/0266116 A1 | 11/2007 | Rensin et al. |
| 2007/0271328 A1 | 11/2007 | Geelen et al. |
| 2007/0276586 A1 | 11/2007 | Jeon et al. |
| 2007/0276587 A1 | 11/2007 | Johnson |
| 2007/0276596 A1 | 11/2007 | Solomon et al. |
| 2007/0281664 A1* | 12/2007 | Kaneko et al. ................ 455/410 |
| 2007/0282521 A1 | 12/2007 | Broughton |
| 2007/0282565 A1 | 12/2007 | Bye et al. |
| 2007/0290920 A1 | 12/2007 | Shintai et al. |
| 2007/0299601 A1 | 12/2007 | Zhao et al. |
| 2008/0004789 A1 | 1/2008 | Horvitz et al. |
| 2008/0004791 A1 | 1/2008 | Sera |
| 2008/0004802 A1 | 1/2008 | Horritt |
| 2008/0005104 A1 | 1/2008 | Flake et al. |
| 2008/0005301 A1 | 1/2008 | Li et al. |
| 2008/0015422 A1 | 1/2008 | Wessel |
| 2008/0021632 A1 | 1/2008 | Amano |
| 2008/0024360 A1 | 1/2008 | Taylor |
| 2008/0024364 A1 | 1/2008 | Taylor |
| 2008/0027636 A1 | 1/2008 | Tengler et al. |
| 2008/0030308 A1 | 2/2008 | Johnson |
| 2008/0032703 A1 | 2/2008 | Krumm et al. |
| 2008/0032721 A1 | 2/2008 | MacDonald et al. |
| 2008/0045234 A1 | 2/2008 | Reed |
| 2008/0046176 A1 | 2/2008 | Jurgens |
| 2008/0052407 A1 | 2/2008 | Baudino et al. |
| 2008/0065311 A1 | 3/2008 | Bauchot et al. |
| 2008/0070593 A1 | 3/2008 | Altman et al. |
| 2008/0071466 A1 | 3/2008 | Downs et al. |
| 2008/0082254 A1 | 4/2008 | Huhtala et al. |
| 2008/0085727 A1 | 4/2008 | Kratz |
| 2008/0086240 A1 | 4/2008 | Breed |
| 2008/0088486 A1 | 4/2008 | Rozum et al. |
| 2008/0091347 A1 | 4/2008 | Tashiro |
| 2008/0096518 A1 | 4/2008 | Mock et al. |
| 2008/0097698 A1 | 4/2008 | Arnold-Huyser et al. |
| 2008/0098090 A1 | 4/2008 | Geraci et al. |
| 2008/0104634 A1 | 5/2008 | Gajdos et al. |
| 2008/0109153 A1 | 5/2008 | Gueziec |
| 2008/0129528 A1 | 6/2008 | Guthrie |
| 2008/0132243 A1 | 6/2008 | Spalink et al. |
| 2008/0132251 A1 | 6/2008 | Altman et al. |
| 2008/0132252 A1 | 6/2008 | Altman et al. |
| 2008/0140308 A1 | 6/2008 | Yamane et al. |
| 2008/0140520 A1 | 6/2008 | Hyder et al. |
| 2008/0153512 A1 | 6/2008 | Kale et al. |
| 2008/0153513 A1 | 6/2008 | Flake et al. |
| 2008/0155453 A1 | 6/2008 | Othmer |
| 2008/0160956 A1 | 7/2008 | Jackson et al. |
| 2008/0161034 A1 | 7/2008 | Akiyama |
| 2008/0167083 A1 | 7/2008 | Wyld et al. |
| 2008/0167796 A1 | 7/2008 | Narayanaswami |
| 2008/0167811 A1 | 7/2008 | Geelen |
| 2008/0172173 A1 | 7/2008 | Chang et al. |
| 2008/0172374 A1 | 7/2008 | Wolosin et al. |
| 2008/0176545 A1 | 7/2008 | Dicke |
| 2008/0177793 A1 | 7/2008 | Epstein et al. |
| 2008/0178116 A1 | 7/2008 | Kim |
| 2008/0186162 A1 | 8/2008 | Rajan et al. |
| 2008/0189033 A1 | 8/2008 | Geelen et al. |
| 2008/0194273 A1 | 8/2008 | Kansal et al. |
| 2008/0200142 A1 | 8/2008 | Abdel-Kader et al. |
| 2008/0207167 A1 | 8/2008 | Bugenhagen |
| 2008/0225779 A1 | 9/2008 | Bragiel et al. |
| 2008/0227473 A1 | 9/2008 | Haney |
| 2008/0233919 A1* | 9/2008 | Kenney ........................ 455/411 |
| 2008/0248815 A1 | 10/2008 | Busch |
| 2008/0249667 A1 | 10/2008 | Horvitz et al. |
| 2008/0268876 A1 | 10/2008 | Gelfand et al. |
| 2008/0284642 A1 | 11/2008 | Seacat et al. |
| 2008/0287124 A1 | 11/2008 | Karabinis |
| 2008/0288166 A1 | 11/2008 | Onishi et al. |
| 2008/0293397 A1 | 11/2008 | Gajdos et al. |
| 2008/0310850 A1 | 12/2008 | Pederson et al. |
| 2008/0319644 A1 | 12/2008 | Zehler |
| 2008/0319652 A1 | 12/2008 | Moshfeghi |
| 2009/0003659 A1 | 1/2009 | Forstall et al. |
| 2009/0005005 A1 | 1/2009 | Forstall et al. |
| 2009/0005018 A1 | 1/2009 | Forstall et al. |
| 2009/0005021 A1 | 1/2009 | Forstall et al. |
| 2009/0005068 A1 | 1/2009 | Forstall et al. |
| 2009/0005070 A1 | 1/2009 | Forstall et al. |
| 2009/0005072 A1 | 1/2009 | Forstall et al. |
| 2009/0005076 A1 | 1/2009 | Forstall et al. |
| 2009/0005080 A1 | 1/2009 | Forstall et al. |
| 2009/0005082 A1 | 1/2009 | Forstall et al. |
| 2009/0005964 A1 | 1/2009 | Forstall et al. |
| 2009/0005965 A1 | 1/2009 | Forstall et al. |
| 2009/0005975 A1 | 1/2009 | Forstall et al. |
| 2009/0005978 A1 | 1/2009 | Forstall et al. |
| 2009/0005981 A1 | 1/2009 | Forstall et al. |
| 2009/0006336 A1 | 1/2009 | Forstall et al. |
| 2009/0006566 A1 | 1/2009 | Veeramachaneni et al. |
| 2009/0018769 A1 | 1/2009 | Poliak |
| 2009/0030605 A1 | 1/2009 | Breed |
| 2009/0031006 A1 | 1/2009 | Johnson |
| 2009/0042585 A1 | 2/2009 | Matsuda |
| 2009/0047979 A1 | 2/2009 | Oh et al. |
| 2009/0089706 A1 | 4/2009 | Furches et al. |
| 2009/0098857 A1 | 4/2009 | DeAtley |
| 2009/0121927 A1 | 5/2009 | Moshfeghi |
| 2009/0143048 A1 | 6/2009 | Ayanamcottil et al. |
| 2009/0177385 A1 | 7/2009 | Matas et al. |
| 2009/0182492 A1 | 7/2009 | Alten |
| 2009/0197612 A1 | 8/2009 | Kiiskinen |

(56) References Cited

U.S. PATENT DOCUMENTS

| | | | |
|---|---|---|---|
| 2009/0201850 A1 | 8/2009 | Davis |
| 2009/0215469 A1 | 8/2009 | Fisher |
| 2009/0228961 A1 | 9/2009 | Wald et al. |
| 2009/0234743 A1 | 9/2009 | Wald et al. |
| 2009/0253408 A1 | 10/2009 | Fitzgerald et al. |
| 2009/0271271 A1 | 10/2009 | Johnson |
| 2009/0281724 A1 | 11/2009 | Blumenberg et al. |
| 2009/0286549 A1 | 11/2009 | Sazegari et al. |
| 2009/0315766 A1 | 12/2009 | Khosravy et al. |
| 2009/0315775 A1 | 12/2009 | Khosravy et al. |
| 2010/0054242 A1 | 3/2010 | Oliver |
| 2010/0082820 A1 | 4/2010 | Furukawa |
| 2010/0106397 A1 | 4/2010 | Van Essen |
| 2010/0131584 A1 | 5/2010 | Johnson |
| 2010/0173647 A1 | 7/2010 | Sheynblat |
| 2010/0190467 A1 | 7/2010 | Scott et al. |
| 2010/0190468 A1 | 7/2010 | Scott et al. |
| 2010/0207782 A1 | 8/2010 | Johnson |
| 2010/0223006 A1 | 9/2010 | Sasaki |
| 2010/0267357 A1 | 10/2010 | Holmstrom et al. |
| 2010/0279652 A1 | 11/2010 | Sharp et al. |
| 2011/0039513 A1 | 2/2011 | Carlstrom |
| 2011/0051658 A1 | 3/2011 | Jin et al. |
| 2011/0072520 A1 | 3/2011 | Bhansali et al. |
| 2012/0025978 A1 | 2/2012 | Ferren et al. |
| 2012/0231811 A1 | 9/2012 | Zohar |

FOREIGN PATENT DOCUMENTS

| | | |
|---|---|---|
| CA | 2287596 | 4/2000 |
| CA | 2432239 | 12/2004 |
| DE | 3 621 456 | 1/1988 |
| DE | 4437360 | 4/1996 |
| DE | 19506890 | 8/1996 |
| DE | 19914257 | 3/1999 |
| DE | 10 141 695 | 3/2003 |
| DE | 10238699 | 3/2004 |
| EP | 0 288 068 | 7/1992 |
| EP | 0 745 867 | 12/1996 |
| EP | 0 763 749 | 3/1997 |
| EP | 0 786 646 | 7/1997 |
| EP | 785535 | 7/1997 |
| EP | 0 809 117 | 11/1997 |
| EP | 0 813 072 | 12/1997 |
| EP | 0 699 330 | 4/1998 |
| EP | 0836131 | 4/1998 |
| EP | 0 908 835 | 4/1999 |
| EP | 0 997 808 | 5/2000 |
| EP | 1 083 764 | 3/2001 |
| EP | 1 300 652 | 4/2003 |
| EP | 1 457 928 | 9/2004 |
| EP | 1 496 338 | 1/2005 |
| EP | 1 770 956 | 9/2005 |
| EP | 1 465 041 | 2/2006 |
| EP | 1 659 817 | 5/2006 |
| EP | 1725056 | 11/2006 |
| EP | 1 790 947 | 5/2007 |
| EP | 1 933 249 | 8/2008 |
| FR | 2730083 | 8/1996 |
| FR | 2754093 | 4/1998 |
| FR | 2272911 | 6/1999 |
| FR | 2810183 | 12/2001 |
| GB | 2 278 196 | 11/1994 |
| GB | 2 322 248 | 8/1998 |
| GB | 2 359 888 | 5/2001 |
| GB | 2 407 230 | 4/2005 |
| JP | 62142215 | 6/1987 |
| JP | 05-071974 | 3/1993 |
| JP | 06-525189 | 5/1994 |
| JP | 2007-221433 | 5/1994 |
| JP | 08-069436 | 3/1996 |
| JP | 09-054895 | 2/1997 |
| JP | 09-098474 | 4/1997 |
| JP | 9-113288 | 5/1997 |
| JP | 09-153125 | 6/1997 |
| JP | 9-062993 | 7/1997 |
| JP | 09-200850 | 7/1997 |
| JP | 9-210710 | 8/1997 |
| JP | 9-319300 | 12/1997 |
| JP | 10-021259 | 1/1998 |
| JP | 11-234736 | 8/1999 |
| JP | 2000-163379 | 6/2000 |
| JP | 2001-008270 | 1/2001 |
| JP | 2001-086228 | 3/2001 |
| JP | 2001-160063 | 6/2001 |
| JP | 2002-310680 | 10/2002 |
| JP | 10-030933 | 2/2003 |
| JP | 2003-228532 | 8/2003 |
| JP | 2004-045054 | 2/2004 |
| JP | 2004-219146 | 7/2004 |
| JP | 2004-362271 | 12/2004 |
| JP | 2005-006021 | 1/2005 |
| JP | 2005-106741 | 4/2005 |
| JP | 2005-182146 | 7/2005 |
| JP | 2005-241519 | 9/2005 |
| JP | 2005/277764 | 10/2005 |
| JP | 2006-112338 | 4/2006 |
| JP | 2006-184007 | 7/2006 |
| JP | 2006-254311 | 9/2006 |
| JP | 2006-270889 | 10/2006 |
| JP | 2006-279838 | 10/2006 |
| JP | 2007-033220 | 2/2007 |
| JP | 2007-033331 | 2/2007 |
| JP | 2007-033368 | 2/2007 |
| JP | 2007-127439 | 5/2007 |
| JP | 2007-147439 | 6/2007 |
| JP | 2007-201699 | 8/2007 |
| JP | 2007-240400 | 9/2007 |
| JP | 2007-259291 | 10/2007 |
| JP | 2007-271299 | 10/2007 |
| JP | 2007-304009 | 11/2007 |
| JP | 2008-058917 | 3/2008 |
| JP | 2008-129774 | 6/2008 |
| JP | 2008-172750 | 7/2008 |
| JP | 2009-94898 | 4/2009 |
| KR | 10-2004-0064997 | 7/2004 |
| KR | 2004-102440 | 12/2004 |
| KR | 10-2005-0002346 | 1/2005 |
| KR | 10-2005-0070845 | 7/2005 |
| KR | 2005-096746 | 10/2005 |
| TW | 200426387 | 12/2004 |
| WO | WO 93/20546 | 10/1993 |
| WO | WO 94/08250 | 4/1994 |
| WO | WO 97/07467 | 2/1997 |
| WO | WO 1997/24577 | 7/1997 |
| WO | WO 97/41654 | 11/1997 |
| WO | WO 98/03951 | 1/1998 |
| WO | WO 98/07112 | 2/1998 |
| WO | WO 98/54682 | 12/1998 |
| WO | WO 99/16036 | 4/1999 |
| WO | WO 99/44183 | 9/1999 |
| WO | WO 99/61934 | 12/1999 |
| WO | WO 01/31966 | 5/2001 |
| WO | WO 01/37597 | 5/2001 |
| WO | WO 2002/054813 | 7/2002 |
| WO | WO 03/023593 | 3/2003 |
| WO | WO 2003/096055 | 11/2003 |
| WO | WO 2004/008792 | 1/2004 |
| WO | WO 2004/021730 | 3/2004 |
| WO | WO 2004/061576 | 7/2004 |
| WO | WO 2004/076977 | 9/2004 |
| WO | WO 2005/084052 | 9/2005 |
| WO | WO 2006/065856 | 6/2006 |
| WO | WO 2006/113125 | 10/2006 |
| WO | 2006/138123 A2 | 12/2006 |
| WO | WO 2007/027065 | 3/2007 |
| WO | 2008/036673 A2 | 3/2008 |
| WO | WO 2008/051929 | 5/2008 |
| WO | WO 2008/085740 | 8/2008 |
| WO | WO 2009/140031 | 11/2009 |

OTHER PUBLICATIONS

Budka et al., "A Bayesian method to Improve Mobile Geolocation Accuracy", IEEE, 2002, pp. 1021-1025.

(56) References Cited

OTHER PUBLICATIONS

Yamamoto et al., "Position Location Technologies Using Signal Strength in Cellular Systems", IEEE, 2001, pp. 2570-2575.
International Search Report and Written Opinion, dated Oct. 1, 2009, issued in PCT/US2009/041298.
Drane et al., "The accurate location of mobile telephones", Third Annual World Congress on Intelligent Transport Systems, Orlando, Florida, Oct. 1996.
"Travel Time Data Collection Handbook—Chapter 5: Its Probe Vehicle Techniques", FHWA-PL-98-035 Report, Department of Transport, University of Texas, Mar. 1998; [online] Retrieved from the Internet at http://www.fhwa.dot.gov/ohim/handbook/chap5.pdf.
Ygnace et al., "Travel Time Estimation on the San Francisco Bay Area Network Using Cellular Phones as Probes", Working Paper, Institute of Transportation Studies, University of California, Berkeley, 2000.
Wang et al., "A Unified Vehicle Supervising and Traffic Information System", IEEE, 1996, pp. 968-972.
Weiss et al., "Zone services—An approach for location-based data collection", Proceedings of the 8th International Conference on E-commerce Technology and the 3rd IEEE International Conference on Enterprise Computing, E-Commerce and E-Services, 2006; 8 pages.
Dey, "Context-Aware Computing: The CyberDesk Project," [online] Retrieved from the Internet: URL: http://www.cc.gatech.edu/fce/cyberdesk/pubs/AAAI98/AAAI98.html; AAAI '98 Spring Symposium, Stanford University, Mar. 23-25, 1998, downloaded from the Internet on Aug. 6, 2010, 8 pages.
Challe, "CARMINAT-An Integrated information and guidance system," Vehicle Navigation and Information Systems Conference, Oct. 20-23, 1991, Renault—Direction de la Recherche, Rueil-Malmaison, France.
Pungel, "Traffic control-beat the jam electronically," Funkschau, 1988, 18:43-45 (w/English translation).
Rillings and Betsold, "Advanced driver information systems," Vehicular Technology, IEEE Vehicular Technology Society, 1991, 40:31-40.
Tsuzawa and Okamoto, "Advanced Mobile Traffic Information and Communication System," First Vehicle Navigation and Information Systems Conference, Sep. 11-13, 1989, Toronto, Canada, Abstract only.
Wong, "GPS: making roads safer and solving traffic tangles," Asia Engineer, 1995, 23(9):31-32.
"iPhone Push Notification Server tied to Snow Leopard Server" [online], Feb. 11, 2009, Roughly Drafted Magazine. Available from: http://www.roughlydrafted.com/2009/02/11/iphone-push-notification-server-tied-to-snow-leopard-server/ [Accessed Aug. 25, 2010].
"Sprite Terminator User Guide," [online] Dec. 6, 2007, pp. 1-45, Retrieved from the Internet: URL: http://www.spritesoftware.com/getmedia/4d21ad24-fd62-4c5e-a4fe-15ebc99aac9a/SpriteTerminator.aspx> [retrieved on Jul. 9, 2010].
Ayatsuka et al., "UbiquitousLinks. Hypermedia Links Embedded in the Real World, Technical Report of Information Processing Society, 96-HI-67," Information Processing Society of Japan, Jul. 11, 1996, 96(62):23-30.
Nagao et al., Walk Navi: A Location-Aware Interactive Navigation/Guideline System and Software III, First edition, pp. 9-48, published by Kindai-Kagaku-Sya Co. Ltd., Dec. 10, 1995.
Benefon ESC! GSM+GPS Personal Navigation Phone, benefon. com, Copyright 2001, 4 pages.
Freundschuh, "Does 'Anybody' Really Want (Or Need) Vehicle Navigation Aids?" First Vehicle Navigation and Information System Conference, Sep. 11-13, 1989, Toronto, Canada, 5 pages.
Gould, "The Provision of Usable Navigation Assistance: Considering Individual Cognitive Ability," First Vehicle Navigation and Information System Conference, Sep. 11-13, 1989, Toronto, Canada, 7 pages.
Mark, "A Conceptual Model for Vehicle Navigation Systems," First Vehicle Navigation and Information System Conference, Sep. 11-13, 1989, Toronto, Canada, 11 pages.

Wheeler et al., "Development of Human Factors Guidelines for Advanced Traveler Information Systems and Commercial Vehicle Operations: Task Analysis of ATIS/CVO Functions," US Dept. Transportation Federal Highway Administration Research and Development, Publication No. FHWA-RD-95-176, Nov. 1996, 124 pages.
Miller et al., "Integrating Hierarchical Navigation and Querying: A User Customizable Solution," ACM Multimedia Workshop on Effective Abstractions in Multimedia Layout, Presentation, and Interaction, San Francisco, CA, Nov. 1995, 8 pages.
Hoogenraad, "Location Dependent Services," 3rd AGILE Conference on Geographic Information Science, Helsinki/Espoo, Finland, May 25-27, 2000, pp. 74-77.
Bonsignore, "A Comparative Evaluation of the Benefits of Advanced Traveler Information System (ATIS) Operational Tests," MIT Masters Thesis, Feb. 1994, 140 pages.
Noonan and Shearer, "Intelligent Transportation Systems Field Operational Test Cross-Cutting Study Advance Traveler Information systems," Intelligent Transportation Systems Field Operational Test Cross-Cutting Study, Sep. 1998, 26 pages.
Burnett, "Usable Vehicle Navigation Systems: Are We There Yet?" Vehicle Electronic Systems 2000, Jun. 29-30, 2000, 3.1.1-3.1.12.
Khattak et al., "Bay Area ATIS Testbed Plan," Research Reports, California Partners for Advanced Transit and Highways (PATH), Institute of Transportation Studies, UC Berkeley, Jan. 1, 1992, 83 pages.
Yim et al., "Travinfo Field Operational Test: Work Plan for the Target, Network, and Value Added Reseller (VAR) Customer Studies," Working Papers, California Partners for Advanced Transit and Highways (PATH), Institute of Transportation Studies, UC Berkeley, Apr. 1, 1997, 49 pages.
Mahmassani et al., "Providing Advanced and Real-Time Travel/Traffic Information to Tourists," Center for Transportation Research, Bureau of Engineering Research, The University of Texas at Austin, Oct. 1998, 15 pages.
"New Handsets Strut Their Stuff At Wireless '99," Internet: URL: http://findarticles.com/p/articles/mi_m0BMD/is_1999_Feb_11/ai_n27547656/ downloaded from Internet on Feb. 11, 1999, 3 pages.
"School Buses to Carry Noticom's First Application," Internet: URL: http://findarticles.com/p/articles/mi_m0BMD/is_1999_Feb_17/ai_n27547754/ downloaded from the Internet on Feb. 17, 1999, 2 pages.
Green et al., "Suggested Human Factors Design Guidelines for Driver Information Systems," Technical Report UMTRI-93-21, Nov. 1993, 119 pages.
Tijerina et al., "Driver Workload Assessment of Route Guidance System Destination Entry While Driving: a Test Track Study," Proceedings of the 5th ITS World Congress, Oct. 12-16, 1998, Seoul, Korea, 9 pages.
Muraskin, "Two-Minute Warnings for School Bus Riders," Internet: URL: http://www.callcentermagazine.com/shared/printableArticle.jhtml;jsessionid=PQH1SZXW...Jul. 1, 1999, 3 pages.
Ni and Deakin, "On-Board Advanced Traveler Information Systems," Dec. 1, 2002, 10 pages.
Serafin et al., "Functions and Features of Future Driver Information Systems," Technical Report UMTRI-91-16, May 1991, 104 pages.
Shekhar and Liu, "Genesis and Advanced Traveler Information Systems (ATIS): Killer Applications for Mobile Computing?" NSF Mobidata Workshop on Mobile and Wireless Information Systems, Nov. 1994, 20 pages.
"LaBarge in joint venture on bus system," Internet: URL: http://www.bizjournals.com/stlouis/stories/1998/08/10/focus2.html?t-printable, Aug. 7, 1998, 1 page.
Clarke et al., "Development of Human Factors Guidelines for Advanced Traveler Information Systems (ATIS) and Commercial Vehicle Operations (CVO): Comparable Systems Analysis," U.S. Department of Transportation Federal Highway Administration, Publication No. FHWA-RD-95-197, Dec. 1996, 212 pages.
Zubac and Strahonj a, "Theory and Development of an Online Navigation System," 18th International Conference on Information and Intelligent Systems, University of Zagreb, Sep. 12-14, 2007.
Brown, "The stick-e document: a framework for creating context-aware applications," Electronic Publishing, 1995, 8:259-272.

(56) References Cited

OTHER PUBLICATIONS

Brown, "Triggering Information by Context," Personal Technologies, 1998, 2:18-27.
Dey et al., "CyberDesk: a framework for providing self-integrating context-aware services," Knowledge-Based Systems, 1998, 11:3-13.
Hodes and Katz, "Composable ad hoc location-based services for heterogeneous mobile clients," Wireless Networks, 1999, 5:411-427.
Kreller et al., "A Mobile-Aware City Guide Application," ACTS Mobile Communication Summit, 1998, Rhodes, Greece, 7 pages.
Lusky et al., "Mapping the Present," ColoradoBiz, Nov. 1999, 26(11):16-17.
McCarthy and Meidel, "ACTIVEMAP: A Visualization Tool for Location Awareness to Support Informal Interactions," HUC '99, LNCS 1707, 1999, pp. 158-170.
O'Grady et al., "A Tourist-Centric Mechanism for Interacting with the Environment," Proceedings of the First International Workshop on Managing Interactions in Smart Environments (MANSE '99), Dublin, Ireland, Dec. 1999, pp. 56-67.
Pascoe et al., "Developing Personal Technology for the Field," Personal Technologies, 1998, 2:28-36.
Tarumi et al., "Public Applications of SpaceTag and Their Impacts," Digital Cities, LNCS 1765, 2000, pp. 350-363.
Tebbutt, "Dial your way out of the woods," The Australian, Feb. 2000, 1 page.
Tso et al., "Always on, Always Connected Mobile Computing," Mobile Communications Operation—Mobile Handheld Products Group, 1996, pp. 918-924.
Wang and Lin, "Location Aware Information Agent over WAP," Tamkang Journal of Science and Engineering, 2000, 3(2):107-115.
"3rd Generation Partnership Project (3GPP); Technical Specification Group (TSG) RAN; Working Group 2 (WG2); Report on Location Services (LCS)," 3G TR 25.923 v.1.0.0, Apr. 1999, 45 pages.
"Report on Location Service feature (LCS) 25.923 v1.0.0," TSG-RAN Working Group 2 (Radio layer 2 and Radio layer 3), Berlin, May 25-28, 1999, 45 pages.
"3rd Generation Partnership Project; Technical Specification Group Services and System Aspects; Functional stage 2 description of location services in UMTS," 3G TS 23.171 v.1.1.0, Nov. 1999, 42 pages.
"3rd Generation Partnership Project; Technical Specification Group Radio Access Network; Stage 2 Functional Specification of Location Services in UTRAN," 3G TS 25.305 v.3.1.0, Mar. 2000, 45 pages.
"Enabling UMTS / Third Generation Services and Applications," No. 11 Report from the UMTS Forum, Oct. 2000, 72 pages.
"3rd Generation Partnership Project (3GPP); Technical Specification Group (TSG) RAN; Working Group 2 (WG2); Report on Location Services," TS RAN R2.03 V0.1.0, Apr. 1999, 43 pages.
"Revised CR to 09/31 on work item LCS," ETSI SMG3 Plenary Meeting #6, Nice, France, Dec. 13-15, 1999. 18 pages.
Digital cellular telecommunications system (Phase 2+); Location Services (LCS); Service description, Stage 1 (GSM 02.71) ETSI, Apr. 1999, 22 pages.
Akerblom, "Tracking Mobile Phones in Urban Areas," Goteborg University Thesis, Sep. 2000, 67 pages.
Borsodi, "Super Resolution of Discrete Arrivals in a Cellular Geolocation System," University of Calgary Thesis, Apr. 2000, 164 pages.
Abowd et al., "Context-awareness in wearable and ubiquitous computing," 1st International Symposium on Wearable Computers, Oct. 13-14, 1997, Cambridge, MA, 9 pages.
Balsiger et al., "MOGID: Mobile Geo-depended Information on Demand," Workshop on Position Dependent Information Services (W3C-WAP), 2000, 8 pages.
Cheverst et al., "Architectural Ideas for the Support of Adaptive Context-Aware Applications," Proceedings of Workshop on Infrastructure for Smart Devices—How to Make Ubiquity an Actuality, HUC'00, Bristol, Sep. 2000, 3 pages.
Cheverst et al., "The Role of Connectivity in Supporting Context-Sensitive Applications," HUC'99, LNCS 1707, 1999, pp. 193-209.
Efstratiou and Cheverst, "Reflection: A Solution for Highly Adaptive Mobile Systems," 2000 Workshop on Reflective Middleware, 2000, 2 pages.
Cheverst et al., "The Support of Mobile-Awareness in Collaborative Groupware," Personal Technologies, 1999, 3:33-42.
Cheverst et al., "Design of an Object Model for a Context Sensitive Tourist Guide," Computers and Graphics, 1999, 23(6):883-891.
Cheverst et al., "Developing Interfaces for Collaborative Mobile Systems," 1999, 15 pages.
Cheverst et al., "Experiences of Developing and Deploying a Context-Aware Tourist Guide: The GUIDE Project," 2000, pp. 20-31.
Cheverst et al., "Exploiting Context to Support Social Awareness and Social Navigation," SIGGROUP Bulleting Dec. 2000, 21(3):43-48.
Cheverst et al., "Services to Support Consistency in Mobile Collaborative Applications," Proc. 3rd International Workshop on Services in Distributed Networked Environments, 1996, 8 pages.
Cheverst et al., "Sharing (Location) Context to Facilitate Collaboration Between City Visitors," 2000, 8 pages.
Cheverst et al., "Supporting Collaboration in Mobile-aware Groupware," Workshop on Handheld CSCW, 1998, 6 pages.
Change Request for "U.S. specific Emergency Services requirements included as an informative annex," Nov. 29, 1999, 2 pages.
Costa et al., "Experiments with Reflective Middleware," Proceedings of the ECOOP'98 Workshop on Reflective Object-Oriented Programming and Systems, ECOOP'98 Workshop Reader, 1998, 13 pages.
Davies et al., "L2imbo: A distributed systems platform for mobile computing," Mobile Networks and Applications, 1998, 3:143-156.
Davies et al., "'Caches in the Air': Disseminating Tourist Information in the Guide System," Second IEEE Workshop on Mobile Computer Systems and Applications, Feb. 25-26, 1999, 9 pages.
Dix et al., "Exploiting Space and Location as a Design Framework for Interactive Mobile Systems," ACM Transactions on Computer-Human Interaction (TOCHI)—Special issue on human-computer interaction with mobile systems, 2000, 7(3):285-321.
Drane et al., "Positioning GSM Telephones," IEEE Communications Magazine, Apr. 1998, pp. 46-59.
Drane and Rizos, "Role of Positioning Systems in ITS," Positioning Systems in Intelligent Transportation Systems, Dec. 1997, pp. 312, 346-349.
Efstratiou et al., "Architectural Requirements for the Effective Support of Adaptive Mobile Applications," 2000, 12 pages.
"Estonian operator to launch world's first Network-based location services," Ericsson Press Release, Oct. 11, 1999, 2 pages.
Fischer et al., "System Performance Evaluation of Mobile Positioning Methods," IEEE, Aug. 2002, pp. 1962-1966.
Flinn and Satyanarayanan, "PowerScope: A Tool for Profiling the Energy Usage of Mobile Applications," Proc. WMCSA '99 Second IEEE Workshop on Mobile Computing Systems and Applications, Feb. 25-26, 1999, 9 pages.
French and Driscoll, "Location Technologies for ITS Emergency Notification and E911," Proc. 1996 National Technical Meeting of the Institute of Navigation, Jan. 22-24, 1996, pp. 355-359.
Friday et al., "Developing Adaptive Applications:The MOST Experience," J. Integrated Computer-Aided Engineering, 1999, pp. 143-157.
Gunnarsson et al., "Location Trial System for Mobile Phones," IEEE, 1998, pp. 2211-2216.
Jose and Davies, "Scalable and Flexible Location-Based Services for Ubiquitous Information Access," HUC'99, LNCS 1707, 1999, pp. 52-66.
Klinec and Nolz, "Nexus-Positioning and Communication Environment for Spatially Aware Applications," IAPRS, Amsterdam, 2000, 7 pages.
Kovacs et al., "Adaptive Mobile Access to Context-aware Services," Proc. ASAMA '99 Proc. First International Symposium on Agent Systems and Applications Third International Symposium on Mobile Agents, IEEE Computer Society Washington, DC, 1999, 12 pages.
Kreller et al., "UMTS: A Middleware Architecture and Mobile API/Approach," IEEE Personal Communications, Apr. 1998, pp. 32-38.
Kugler and Lechner, "Combined Use of GPS and LORAN-C in Integrated Navigation Systems," Fifth International Conference on

(56) References Cited

OTHER PUBLICATIONS

Satellite Systems for Mobile Communications and Navigation, London, UK, May 13-15, 1996, pp. 199-207.
Kyriazakos et al., "Optimization of the Handover Algorithm based on the Position of the Mobile Terminals," Communications and Vehicular Technology, Oct. 2000, pp. 155-159.
Leonhardt and Magee, "Multi-Sensor Location Tracking," MOBICOM 98, Dallas, TX, pp. 203-214.
Leonhardt and Magee, "Towards a general location service for mobile environments," Proc. Third International Workshop on Services in Distributed and Networked Environments, Jun. 3-4, 1996, 8 pages.
Long et al., "Rapid Prototyping of Mobile Context-Aware Applications: The Cyberguide Case Study," MobiCom '96, 1996, 11 pages.
Yokote, "The Apertos Reflective Operating System: the Concept and Its Implementation," OOPSLA'92, pp. 414-434.
Popescu-Zeletin et al., "Applying Location-Aware Computing for Electronic Commerce: Mobile Guide," Proc. 5th Conference on Computer Communications, ARICOM-CCDC'98,Oct. 20-22, 1998, 14 pages.
Zhao, "Mobile Phone Location Determination and Its Impact on Intelligent Transportation Systems," IEEE Transactions on Intelligent Transportation Systems, Mar. 2000, 1(1):55-64.
Microsoft Outlook 2003 User's Guide, http://opan.admin.ufl.edu/user_guides/outlook2003.htm. Aug. 2004, 17 pages.
"Error: could not find a contact with this e-mail address." Outlookbanter.com. Dec. 2006, 12 pages.
Examiner Simin Baharlou, International Preliminary Report on Patentability in PCT/US2010/033003 mailed Nov. 10, 2011, 6 pages.
Millard et al. "XEP-0060"; XMPP Standards Foundation, last updated Sep. 3, 2008; available at http://xmpp.org/extensions/attic/xep-0060-1.12.html (last accessed on Nov. 21, 2012); pp. 1-179.
Non-final office action in Japanese Application No. 2010-118788, issued Jul. 24, 2012, pp. 1-6.
Office Action in JP Application No. 2012—508744, Feb. 7, 2013, pp. 1-4.
Sam Oliver "Apple testing 'Find my iPhone' ahead of other MobileMe Improvements" published Jun. 9, 2009, downloaded Mar. 13, 2013 from appleinsider.com/articles/09/6/09/ apple_testing_find_my_iphone_ahead_of other_mobileme_improvements, pp. 1-11.
Prince McLean "MobileMe Pushes out new Find My iPhone, Remote Wipe Service" published Jun. 17, 2009, downloaded Mar. 13, 2013 from appleinsider.comiarticles/09/06/17/mobileme_pushes_out_new_find_my_iphone_remote_wipe_service, pp. 1-10.
"27 Countries in your pocket"; [online] [Retrieved on Sep. 29, 2005] Retrieved from the Internet <URL: http://www.mio-tech.be/en/printview/press-releases-2005-09-29.htm; 1 page.
"Animated Transition"; [online] [Retrieved on Oct. 16, 2006] Retrieved from the Internet <URL: http://designinterfaces.com/Animated_Transition; 2 pages.
"DaimlerCrysler Guide5 Usecases Overview Map", 1 page (no reference date).
"dialDTMF" [online] [Retrieved Jan. 10, 2008] Retrieved from the Internet, URL: http://dialdtmf.sourceforge.net/, 9 pages.
"FAQ"; [online] [Retrieved Nov. 30, 2007] Retrieved from the Internet, URL: http://www.navizon.com/FAQ.htm; 8 pages.
"How it Works"; Navizon—Peer-to-Peer Wireless Positioning; [online] [Retrieved on Nov. 30, 2007]; Retrieved from the Internet, URL: http://www.navizon.com/FullFeatures.htm, 7 pages.
"International Roaming Guide—Personal Experience(s) from Customer and Community Member"; [online] [Retrieved Jun. 26, 2006] Retrieved from the Internet <URL: http://forums.cingular.com/cng/board/message?board.id=1185; 6 pages.
"iPhone Software/Hardware Hack: LocoGPS—GPS Add-on for the iPhone"; [online] [Retrieved on Dec. 25, 2007] Retrieved from the Internet <URL: http://www.iphonehacks.corriliphone_applications/index.html; 41 pages.
"Mio 269+Users Manula"; 2005; 44 pages.

"MOREnet Dialing Plan: PSTN and IP Network Integration for H.323, H320 VoIP and Public Voice Networks", [online] [Retrieved on Jan. 11, 2008] Retrieved from the Internet < URL: http://www.more.net/technical/research/dialplan/index.html, 12 pages.
"New program for mobile blogging for PocketPC released: MY BLOG"; [online] [Retrieved on Apr. 5, 2006]; Retrieved from the Internet, URL: http://msmobiles.com/news.php/4067.html.
"Numbering and Dialing Plan within the United States", Alliance for Telecommunications Industry Solutions; 2005; 17 pages.
"nüvifone Images"; [online] [Retrieved on Feb. 4, 2008]; Retrieved from the Internet, URL: http://www8.garmin.com/buzz/nuvifone/media_gallery.jsp; 2 pages.
Review Guide—Google Maps for mobile (beta); Google; 2006; 7 pages.
"User-centered design of mobile solutions", NAMAHN, 2006, 18 pages.
"User's Manual MioMap 2.0"; Aug. 2005; 60 pages.
"Windows Live Search for Mobile Goes Final, Still Great"; [online] [Retrieved on Mar. 11, 2007]; Retrieved from the Internet, URL: http://gizmodo.com/gadgets/software/windows-live-search-for-mobile-goes-fmal-still-great-236002.php; 3 pages.
"Windows Mobile 6 Professional Video Tour"; [online] [Retrieved on Mar. 11, 2007]; Retrieved from the Internet, URL: http://gizmodo.com/gadgets/cellphones/windows-mobile-6-professional-video-tour-237039.php; 4 pages.
"Windows Mobile"; Microsoft; 2007, 2 pages.
Anand et al., "Quantitative Analysis of Power Consumption for Location-Aware Applications on Smart Phones", IEEE International Symposium on Industrial Electronics, 2007.
Balliet, "Transportation Information Distribution System", IBM Technical Disclosure Bulletin, [online] [Retrieved Nov. 7, 2008] Retrieved from the Internet, URL: https://www.delphion.corn/tdbs/tdb?order=86A+61395; Jun. 1986; 2 pages.
Beard et al., "Estimating Positions and Paths of Moving Objects", IEEE 2000, pp. 1-8.
Bederson, B.B., Audio Augmented Reality: A Prototype Automated Tour Guide [online] [retrieved on Aug. 30, 2002] [retrieved from http://www.cs.umd.edu/~bederson/papers/chi-95-aar/] pp. 1-4.
Berman et al., "The Role of Dead Reckoning and Inertial Sensors in Future General Aviation Navigation", IEEE, 1998, pp. 510-517.
Bevly et al., "Cascaded Kalman Filters for Accurate Estimation of Multiple Biases, Dead-Reckoning Navigation, and Full State Feedback Control of Ground Vehicles", IEEE Transactions on Control Systems in Technology, vol. 15, No. 2, Mar. 2007, pp. 199-208.
Binzhuo et al., "Mobile Phone GIS Based on Mobile SVG", IEEE 2005.
Bokharouss et al., "A Location-Aware Mobile Call Handling Assistant", International Conference on Advanced Information Networking and Applications Workshops, 2007.
Boonsrimuang et al., "Mobile Internet Navigation System", IEEE, 2002, pp. 325-328.
Camp et al., "A computer-based method for predicting transit time systems", Decsision Sciences, vol. 5, pp. 339-346, 1974.
Carew; "Phones that tell you where to drive, meet, eat"; [online] [Retrieved May 26, 2007]; Retrieved from the Internet <URL htllp://news.yahoo.com/s/nm/20070525/wr_nm/column_pluggedin_dc_2&printer=1;_ylt=Ahqaftn7xmlS2rOFZFeu9G4ht.cA; 2 pages.
Charny, "AT&T puts 411 to the text"; [online] [Retrieved Mar. 4, 2009]; Retrieved from the Internet <URL http://news.cnet.com/ATT-puts-411-to-the-text/2100-1039_3-1000669.html; May 8, 2003; 2 pages.
Cho et al., A Traveler Information Service Structure in Hybrid T-DMB and Cellular Communication Network, Broadcast Systems Research Group, IEEE, 2006, pp. 747-750.
Christie et al., "Development and Deployment of GPS wireless devices for E911 and Location based services", IEEE 2002.
Chua et al., "Intelligent Portal for Event-triggered SMS Alerts", 2nd International Conference on Mobile Technology, Applications and Systems, 2005.
Civilis et al., "Efficient Tracking of Moving Objects with Precision Guarantees", IEEE, Proceedings of the First Annual International Conference on Mobile and Ubiquitous Systems: Networking and Services, 2004, 10 pages.

(56) References Cited

OTHER PUBLICATIONS

Dalrymple, Jim; "Google Maps adds locator, but not for iPhone", [online] [Retrieved Nov. 30, 2007]; Retrieved from the Internet <URL: http://news.yahoo.com/s/macworld/20071130/tc_macworld/googlemaps20071130_0&printer=1;_ylt =Auvf3s6LQK_p0aJlb954T_DQn6gB; 1 page.
Dibdin, Peter, "Where are mobile location based services?", Dec. 14, 2001, pp. 1-8.
Dunn et al., "Wireless Emergency Call System", IBM TDB, Sep. 1994.
Ebine, "Dual Frequency resonant base station antennas for PDC systems in Japan", IEEE, pp. 564-567, 1999.
Evans, "In-Vehicle Man-Machine Interaction the Socrates Approach", Vehicle Navigation & Information System Conference Proceedings, 1994, Aug. 31-Sep. 2, 1994, pp. 473-477.
FM 3-25.26 Map Reading and Land Navigation Field Manual No. 3-25.26, Headquarters Department of the Army, Washington, DC [online] [retrieved on Apr. 9, 2004] [retrieved from http://155.217.58.58/cgi-bin/atdl.dll/fm/3-25.26/toc.htm] Jul. 20, 2001, pp.. 1-7 and J-1 to J-3.
GPS *12 Personal Navigator Owner's Manual & Reference*, Garmin Corporation, Jan. 1999, pp. 1-60.
Guo et al., "An Intelligent Query System based on Chinese Short Message Service for Restaurant Recommendation", IEEE 2007, 1 page.
Hameed et al., "An Intelligent Agent-Based Medication and Emergency System", IEEE 2006.
Helal et al., "Drishti: An Integrated Navigation System for Visually Impaired and Disabled", Fifth International Symposium on Wearable Computers (ISWC'01), IEEE, 2001, pp. 149-156.
Hohman et al., "GPS Roadside Integrated Precision Positioning System", Position Location and Navigation Symposium (IEEE 2000), pp. 221-230.
International Numbering and SMS—Type of Numbering, TON, Numbering Plan Indicator, NPI, [online] [Retrieved Jan. 05, 2007] Retrieved from the Internet <URL: http://www.activexperts.com/support/activsms/tonnpi/.
Jain, R., Potential Networking Applications of Global Positioning Systems (GPS) [online] [retrieved on Nov. 18, 2008] [retrieved from http://arxiv.org/ftp/cs/papers/9809/9809079.pdf] OSU Technical Report TR-24, Apr. 1996, pp. 1-40.
Jirawimut et al., "A Method for Dead Reckoning Parameter Correction in Pedestrian Navigation System", IEEE Transactions on Instrumentation and Measurement, vol. 52, No. 1, Feb. 2003, pp. 209-215.
Ju et al., "RFID Data Collection and Integration based on Mobile Agent", IEEE, 2006.
Kbar et al., "Mobile Station Location based on Hybrid of Signal Strength and Time of Arrival", IEEE, 2005.
Koide et al., "3-D Human Navigation System with Consideration of Neighboring Space.Information", IEEE International Conference on Systems, Man and Cybernetics, 2006 (SMC '06), vol. 2, (Oct. 8-11, 2006), pp. 1693-1698.
Lloyd et al., "Cellular phone base stations installation violate the Electromagnetic Compatibility regulations", IEEE, 2004.
Manabe et al., "On the M-CubITS Pedestrian Navigation System", IEEE, 2006, pp. 793-798.
Meier et al., "Location-Aware Event-Base Middleware: A Paradigm for Collaborative Mobile Applications?", Sep. 2003.
Miller et al., "Synchronization of Mobile XML Databases by Utilizing Deferred Views", IEEE 2004.
Nardi et al., "Integrating Communication and Information through Contact Map", Communications of the ACM, vol. 45, No. 4, Apr. 2002.
Navizon Peer-to-Peer Wireless Positioning; [online] [Retrieved on Nov. 30, 2007]; Retrieved from the Internet, URL: http//www.navizon.com/; 2 pages.
Northard, "Docking Station Communication Link", IBM TDB, Feb. 1994.
Oh et al., "Spatial Applications Using 4S Technology for Mobile Environment", IEEE 2002.
Paksoy et al., "The Global Position System-Navigation Tool of the Future", Journal of Electrical & Electronics, 2002, vol. 2, No. 1, pp. 467-476.
Parikh, "Tele Locate", IBM Technical Disclosure Bulletin, [online] [Retrieved Nov. 7, 2008].Retrieved from the Internet, URL: https://www.delphion.com/tdbs/tdb?order=92A+62775; Sep. 1992; 1 page.
Partial International Search Report, dated Jul. 29, 2008, issued in corresponding PCT/US2008/050295.
International Search Report and Written Opinion, dated Jun. 9, 2008, issued in International Application No. PCT/US2007/088880, filed Dec. 27, 2007.
Pfoser et al., "Dynamic Travel Time Maps—Enabling Efficient Navigation", Proceedings of the 18th International Conference on Scientific and Statistical Database Management (SSDBM'06), IEEE, 10 pages. No Date Provided.
Portfolio 2007; [online] [Retrieved on Jun. 14, 2007]; Retrieved from the Internet, URL: http://eric.wahlforss.com/folio; 3 pages.
RD 409052, Research Disclosure Alerting Abstract, "Location dependent information for satellite based vehicle communication—required application of Global Position System (GPS) to automatically extract relevant portions of data package as vehicle changes position," May 10, 1998, 1 page.
Rekimoto, J., *Augment-able Reality: Situated Communication through Physical and Digital Spaces*, iswc, pp. 68, Second International Symposium on Wearable computers (ISWC'98), 1998, pp. 1-8.
Rogers et al., "Adaptive User Interfaces for Automotive Environments", IEEE Intelligent Vehicles Symposium 2000, Oct. 3-5, 2000, pp. 662-667.
Rozier, J., *Hear & There: An Augmented Reality System of Linked Audio*, Proceedings of the International Conference on Auditory Display, Atlanta, GA, Apr. 2000, pp. 1-6.
Samadani et al., "PathMaker: Systems for Capturing Trips", IEEE (2004) International Conference on Multimedia and Expo., Publication Date: Jun. 27-30, 2004, vol. 3, pp. 2123-2126, 2004.
Schreiner, "Where We At? Mobile Phones Bring Gps to the Masses", IEEE Computers Society, May/Jun. 2007, pp. 6-11.
Spohrer. "New Paradigms for Using Computers", 1997; retrieved from the Internet, URL: <http://almaden.ibm.com/npuc97/1997/spohrer.htm>.
Sung et al., "Towards Reliable Peer-to-Peer Data Sharing over Mobile Ad hoc Networks", IEEE, 2005.
Weiss et al., "Zone services—An approach for location-based data collection", Proceedings of the 8th International Conference on E-commerce Technology and the 3rd IEEE International Conference on Enterprise Computing, E-Commerce and E-Services (8 pages), 2006.
Yang et al., "A Mutlimedia System for Route Sharing and Video-based Navigation", IEEE, 2006, pp. 73-76.
Yang et al. "Global Snapshots for Distributed Debugging", IEEE, pp. 436-440, 1992.
Yanyan et al., "The model of optimum route selection in vehicle automatic navigation system based on unblocked reliability analyses", IEEE 2003.
"Cyberguide: a mobile context-aware tour guide", Wireless Networks Archive (Special Issue: Mobile computing and networking; selecting papers from MobiCom '96), 3(5):421-433, 1997.
"Frontiers in electronic media", Interactions Archive 4(4):32-64, 1997.
"Location-aware mobile applications based on directory services", International Conference on Mobile Computing and Networking Archive, Proceedings on the 3rd Annual ACM/IEEE International Conference on Mobile Computing and Networking, Budapest, Hungary, pp. 23-33, 1997.
Sharp et al., U.S. Appl. No. 12/434,586, filed May 1, 2009.
Van Os et al., U.S. Appl. No. 12/165,413, filed Jun. 30, 2008.
Blumenberg et al., U.S. Appl. No. 12/119,316, filed May 12, 2008.
Low et al., U.S. Appl. No. 12/233,358, filed Sep. 18, 2008.
Sazegari et al., U.S. Appl. No. 12/122,339, filed May 16, 2008.

(56) References Cited

OTHER PUBLICATIONS

Johnson, U.S. Appl. No. 12/044,363, filed Mar. 7, 2008.
Johnson, U.S. Appl. No. 11/827,065, filed Jul. 10, 2007.
Herz, U.S. Appl. No. 12/270,814, filed Nov. 13, 2008.
Office Action in Japanese Patent Application No. 2010-118788, Dec. 13, 2012, pp. 1-2.
Response to Jun. 12, 2013 Office Action from U.S. Appl. No. 12/750,600, Stuart Slack, et al, Response filed Jul. 9, 2013, pp. 1-11.
Response to May 2, 2013 Office Action from U.S. Appl. No. 12/434,586, Christopher Brooke Sharp, et al, Response filed May 24, 2013, pp. 1-13.
US 6,731,928, 05/2004, Tanaka (withdrawn)

\* cited by examiner

REMOTELY RECEIVING AND COMMUNICATING COMMANDS TO A MOBILE DEVICE FOR EXECUTION BY THE MOBILE DEVICE

CROSS-REFERENCE TO RELATED APPLICATIONS

This application is related to co-pending U.S. patent application entitled "Securely Locating a Device," U.S. patent application Set. No. 11/938,745, filed Nov. 12, 2007. This application also is related to co-pending U.S. patent application entitled "Remotely Locating and Commanding a Mobile Device," U.S. patent application Set. No. 12/434,586, filed May 1, 2009.

TECHNICAL FIELD

The present disclosure relates to remotely communicating with a mobile device, such as a mobile telephone or a media player, and to causing the mobile device to perform a function through the transmission of one or more remote commands.

BACKGROUND

Mobile devices have been adapted to a wide variety of applications, including computing, communication, and entertainment. For example, mobile telephones permit users to freely initiate and receive voice communications. Similarly, mobile media devices have been developed to permit users to take electronic entertainment, including audio, video, and electronic games, to even the most remote location. Further, mobile computing devices have been developed to provide users with remote access to data communications through wireless connectivity, such as over IEEE 802.11 or 3G networks. Some mobile devices, such as smart phones, support a combination of voice communications, entertainment, and mobile computing.

Because mobile devices are sized for portability, they easily can be misplaced. Also, because mobile devices often are carried to many different locations, they can be forgotten or lost. Further, because of their convenience and portability, mobile devices often are used to store a large amount of personal data. For example, a mobile device can be used to store an entire address book of contact information, electronic mail and text messages relating to business and personal matters, account information, one or more galleries of images, and a library of music. Thus, the loss of a mobile device also can incur the loss of a substantial amount of data, including sensitive personal data.

Ownership of a mobile device can be indicated in a number of ways. For example, owners can mark a mobile device with identifying information, such as a name, address, or telephone number. The mobile device can be marked physically, such as through a label or an engraving, or electronically, such as through registration information stored on the mobile device. Further, with respect to mobile telephones, an attempt can be made to recover a lost device. For example, a user can call a lost mobile telephone to speak with a finder who is willing to answer. If the finder is honest, the mobile telephone can be returned to the rightful owner. However, mobile devices and the services they provide access to often are valuable and a mobile device thus may not be returned if lost or may be intentionally stolen.

To prevent the data stored on a lost mobile device from being compromised, the data can be protected against unauthorized access in a variety of ways. For example, access to the data and/or applications can be protected through login credentials, such as a system password. The mobile device can block any access or functionality until the correct login information is supplied. Further, file encryption can be linked to a security password, such that files remain encrypted until the correct login information is supplied. A mobile device also can be locked after multiple unsuccessful attempts at access to prevent hacking. For example, a mobile device can be configured such that repeated password failures lock the mobile device to prevent any further use. Alternatively, a service provider can be contacted to disable further use of the mobile device, such as by deactivating a corresponding account.

SUMMARY

A mobile device can be remotely contacted and commanded to perform one or more operations, such as through the transmission of a message to the device. Further, before the mobile device is lost, it can be configured to support one or more remote commands. The remote commands supported can be selectively enabled by the mobile device owner. A mobile device also can support one or more remote commands by default.

The transmission of one or more remote commands to the mobile device can be initiated from a networked computing device, such as through a web service. The mobile device also can confirm receipt of one or more remote commands and can acknowledge that an associated operation or instruction has been or will be executed. For example, messages can be transmitted to and from the mobile device through a notification service implemented using a publish-subscribe ("PubSub") framework.

The present inventors recognized a need to allow a mobile device owner to remotely issue one or more commands to the mobile device, including commands used to present a message or sound on the mobile device, or to wipe or locate the mobile device. Further, the need to receive one or more messages from the mobile device acknowledging and/or responding to a remote command also was recognized. The present inventors also recognized the need to provide a web-based application configured to facilitate remote management of one or more mobile devices.

The present inventors also recognized the need to allow reconfiguring a mobile device to alter or disable support for one or more remote commands. Further, the need for the mobile device to automatically retrieve command messages also was recognized. Also, the present inventors recognized the need to permit transmitting multiple remote commands to a mobile device, such as a locate command and a message command. Additionally, the present inventors recognized the need to permit disassociating a mobile device from a remote management account, such as when ownership of the mobile device changes. Accordingly, the techniques and apparatus described here implement algorithms for remotely communicating with a mobile device to cause the mobile device to perform functions through the transmission of one or more remote commands.

In general, in one aspect, the techniques can be implemented to include receiving input identifying a mobile device, presenting to a user one or more remote commands corresponding to the mobile device, receiving user input selecting a remote command from the one or more presented remote commands, generating a remote command message instructing the mobile device to execute the selected remote command, and transmitting the remote command message to a server for publication in a message topic.

The techniques also can be implemented such that the message topic uniquely corresponds to the mobile device. Further, the techniques can be implemented such that presenting to a user one or more remote commands also includes identifying at least one of the one or more remote commands as enabled for execution by the mobile device. Also, the techniques can be implemented to include presenting to a user a selectable list of mobile devices associated with a remote management account, the selectable list including information uniquely identifying each mobile device. Additionally, the techniques can be implemented to include indicating, for a mobile device included in the selectable list of mobile devices, whether the mobile device is online.

The techniques also can be implemented to include receiving a result message confirming execution of the selected remote command by the mobile device. Further, the techniques can be implemented such that the remote command is a locate command. Also, the techniques can be implemented to include receiving a result message including geographic coordinates corresponding to a location of the mobile device. The techniques further can be implemented such that the remote command comprises a wipe command. Additionally, the techniques can be implemented to include receiving a result message confirming initiation of a wipe process by the mobile device and identifying the mobile device as an inactive device.

In general, in another aspect, the techniques can be implemented as a computer program product, encoded on a computer-readable medium, operable to cause data processing apparatus to perform operations including presenting to a user a list of one or more mobile devices associated with a remote management account, receiving user input selecting a mobile device included in the list of one or more mobile devices, presenting to a user a list of one or more remote commands corresponding to the selected mobile device, receiving user input selecting a remote command from the list of one or more remote commands, generating a remote command message identifying the selected remote command, and transmitting the remote command message to a server for publication in a message topic corresponding to the selected mobile device.

The techniques also can be implemented to be further operable to cause data processing apparatus to perform operations including displaying, for one or more mobile devices included in the presented list, an indication that the mobile device is online. Additionally, the techniques can be implemented to be further operable to cause data processing apparatus to perform operations including identifying at least one remote command included in the list of one or more remote commands that is not enabled for execution on the selected mobile device.

The techniques also can be implemented to be further operable to cause data processing apparatus to perform operations including prompting the user to provide an item of information in response to the selected remote command. Further, the techniques can be implemented such that the item of information comprises a message to be displayed on the mobile device. Also, the techniques can be implemented such that the item of information comprises confirmation of a wipe command. Additionally, the techniques can be implemented to be further operable to cause data processing apparatus to perform operations including retrieving a result message generated by the mobile device in response to the remote command from a result topic identified in the remote command message.

In general, in another aspect, the subject matter can be implemented as a system including a server hosting a message topic and a computing system including an input interface, a display, and processor electronics configured to perform operations including presenting, on the display, a user interface listing one or more mobile devices associated with a remote management account, receiving, through the input interface, a user selection corresponding to one of the one or more mobile devices, presenting, in the user interface, one or more remote commands enabled for execution by the selected mobile device, receiving, through the input interface, a user selection corresponding to one of the one or more remote commands, and transmitting a remote command message corresponding to the selected remote command to a server for publication in a message topic.

The techniques also can be implemented such that the server is further configured to host a result topic. Also, the techniques can be implemented such that the processor electronics are further configured to perform operations including retrieving from the result topic a result message generated by the selected mobile device in response to the remote command message. Further, the techniques can be implemented such that the result message includes an execution time associated with the selected remote command.

The techniques also can be implemented such that the processor electronics are further configured to perform operations including presenting, in the user interface, one or more disabled remote commands corresponding to the selected mobile device, receiving, through the input interface, a user selection corresponding to one of the one or more disabled remote commands, and transmitting a message to the selected mobile device enabling the disabled remote command for execution by the selected mobile device. Further, the techniques can be implemented such that the selected remote command comprises a locate command. Additionally, the techniques can be implemented such that the processor electronics are further configured to perform operations including receiving a result message corresponding to the locate command, the result message including geographic coordinates associated with the selected mobile device and presenting, on the display, a map depicting a location of the selected mobile device in accordance with the associated geographic coordinates.

The techniques described in this specification can be implemented to realize one or more of the following advantages. For example, the techniques can be implemented such that the location of a lost mobile device can be remotely requested and acquired. The techniques also can be implemented to permit transmitting one or more remote commands to a mobile device using a store and forward message framework. The remote commands can include a message command, a locate command, a sound command, and a wipe command. Further, a PubSub model can be employed to facilitate communications between a command application and a mobile device, such that the mobile device can access a subscribed node when data communications are available. Additionally, the techniques can be implemented to permit transmitting information and/or acknowledgement messages from the mobile device in response to a remote command. The techniques also can be implemented such that a communication node monitored by a mobile device can be automatically created when the associated mobile device account is created. The techniques further can be implemented to permit delivering a remote command to a mobile device and receiving a response from the mobile device in near real-time.

The details of one or more implementations are set forth in the accompanying drawings and the description below. Other features and advantages will be apparent from the description and drawings, and from the claims.

BRIEF DESCRIPTION OF THE DRAWINGS

Like reference symbols indicate like elements throughout the specification and drawings.

DETAILED DESCRIPTION

Figure 1:
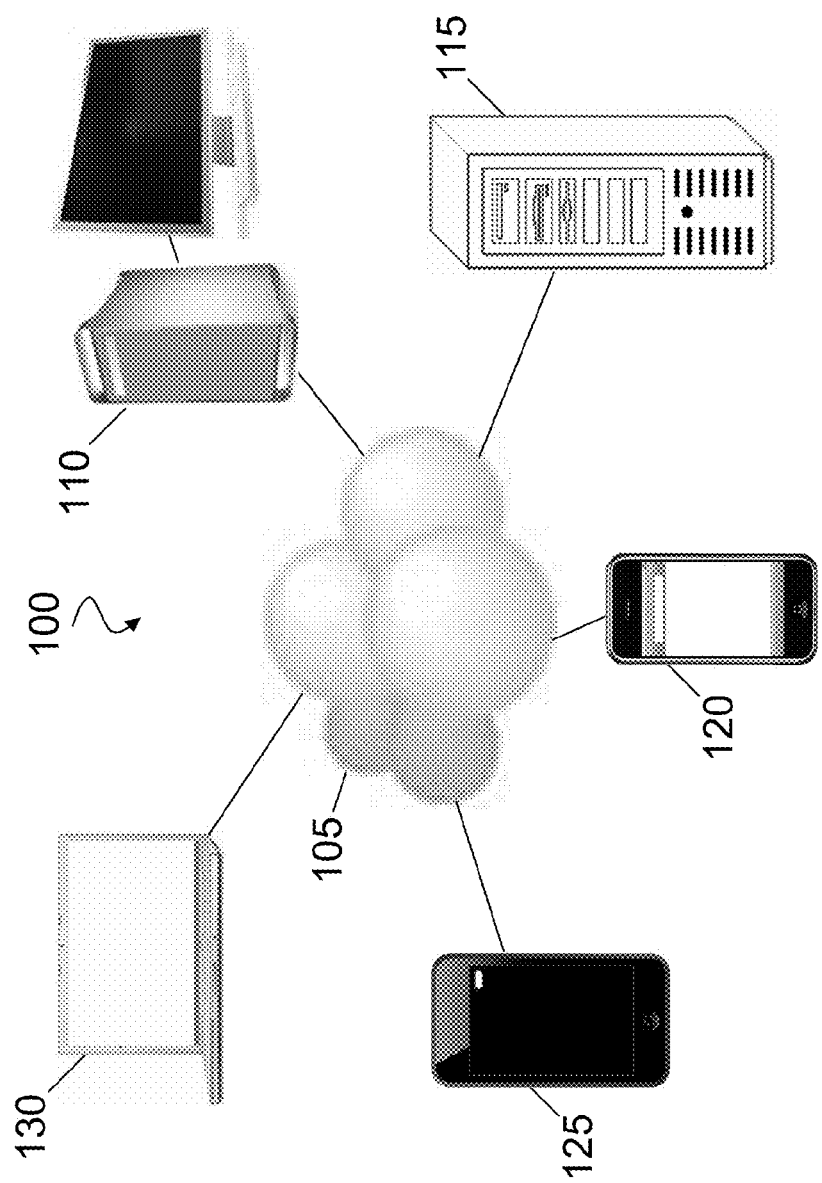
FIG. 1 shows an exemplary computing environment that includes mobile devices and a notification server.

FIG. 1 shows an exemplary computing environment that includes mobile devices and a notification server. A communication network 105 connects the devices and applications hosted in the computing environment 100. The communication network 105 can be any type of network, including a local area network ("LAN"), such as an intranet, and a wide area network ("WAN"), such as the internet. Further, the communication network 105 can be a public network, a private network, or a combination thereof. The communication network 105 also can be implemented using any type or types of physical media, including wired communication paths and wireless communication paths associated with multiple service providers. Additionally, the communication network 105 can be configured to support the transmission of messages formatted using a variety of protocols.

A user station 110 can be configured to operate in the computing environment 100. The user station 110 can be any computing device that can be configured to communicate with a web-enabled application, such as through a web browser. For example, the user station 110 can be a personal computing device, such as a desktop or workstation, or a portable computing device, such as a laptop or smart phone. The user station 110 can include an input interface through which one or more inputs can be received. For example, the input interface can include one or more of a keyboard, a mouse, a joystick, a trackball, a touch pad, a touch screen, and a microphone. The user station 110 also can include an output interface through which output can be presented, including one or more of a display, one or more speakers, and a haptic interface.

The user station 110 further can include a network connection to the communication network 105. The network connection can be implemented through a wired or wireless interface, and can support bi-directional communication between the user station 110 and one or more other computing devices over the communication network 105. Also, the user station 110 includes an interface application, such as a web browser or custom application, for communicating with a web-enabled application.

An application server 115 also can be configured to operate in the computing environment 100. The application server 115 can be any computing device that can be configured to host one or more applications. For example, the application server 115 can be a server, a workstation, or a personal computer. In some implementations, the application server 115 can be configured as a collection of computing devices, e.g. servers, sited in one or more locations. The application server 115 can include an input interface through which one or more inputs can be received. For example, the input interface can include one or more of a keyboard, a mouse, a joystick, a trackball, a touch pad, a touch screen, and a microphone. The application server 115 also can include an output interface through which output can be presented, including one or more of a display, a haptic interface, and one or more speakers.

The application server 115 further can include a network connection to the communication network 105. The network connection can be implemented through a wired or wireless interface, and can support bi-directional communication between the application server 115 and one or more other computing devices over the communication network 105. Further, the application server 115 can be configured to host one or more applications. For example, the application server 115 can be configured to host a remote management application that facilitates communication with one or more mobile devices associated with an account. The mobile devices and the application server 115 can operate within a remote management framework to execute remote management functions. The application server 115 also can be configured to host a notification service application configured to support bi-directional communication over the communication network 105 between multiple communication devices included in the computing system 100. For example, the notification service application can permit a variety of messages to be transmitted and received by multiple computing devices.

Figure 13:
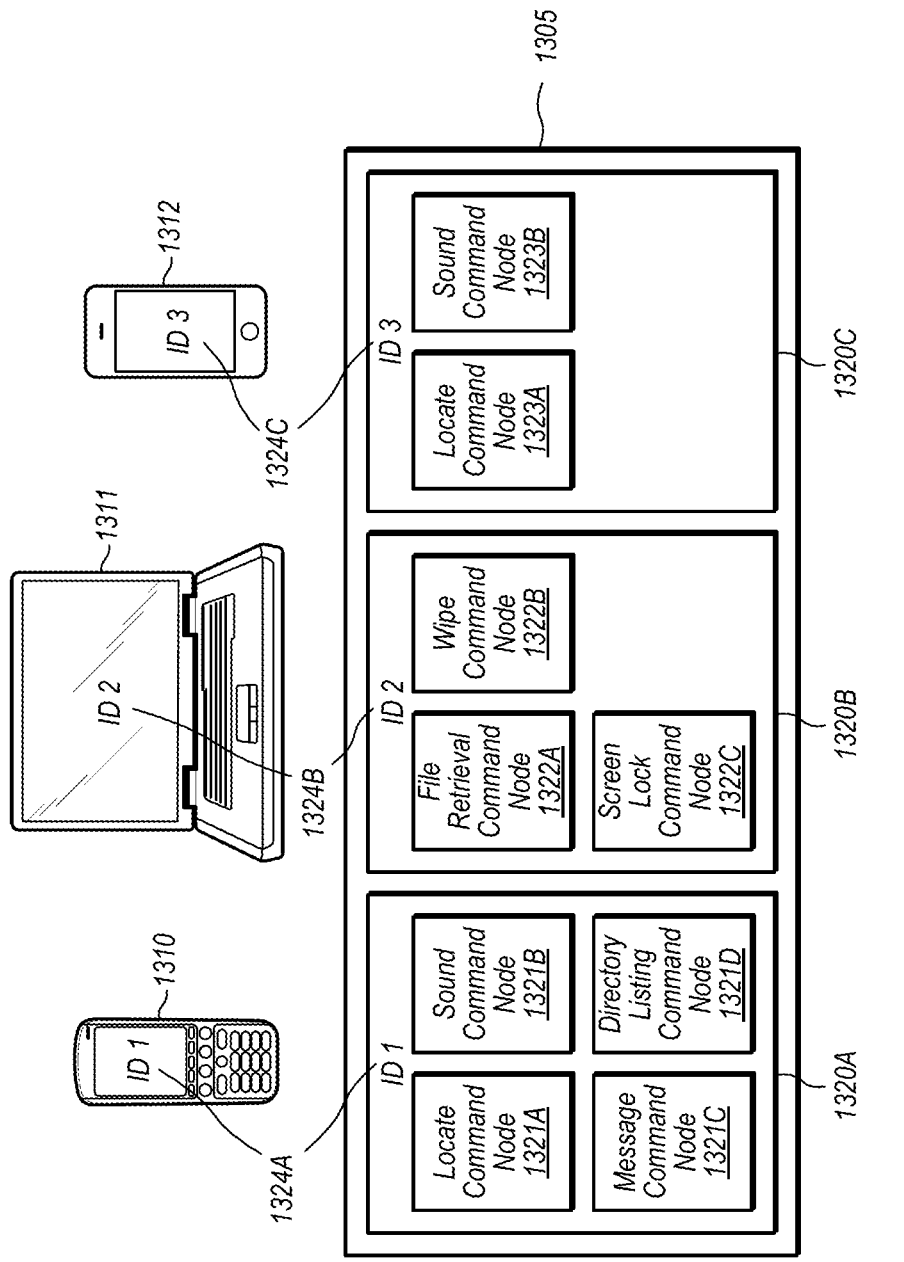
FIG. 13 shows an exemplary notification service, in which a unique command collection topic has been created for each subscribing mobile device.

FIG. 13 shows an example implementation, in which the notification service 1305 can include a defined namespace, in which a unique command collection topic (1320A-1320C) can be created for each subscribing mobile device (1310-1312). A unique identifier (e.g. 1324A) can be used to associate a subscribing mobile device (e.g. 1310) with the corresponding command collection topic (e.g. 1320A), such as an assigned number or address. The unique identifier also can be embedded in a Uniform Resource Identifier (URI) that is associated with a subscribed command collection topic. Further, one or more command nodes (1321-1323) can be created below a command collection topic, such that each command node corresponds to a particular remote command type. For example, a command collection topic can include a separate command node for each of: locate commands (1321A), message commands (1321C), sound commands (1321B), directory listing commands (1321D), file retrieval commands (1322A), screen lock commands (1322C), and wipe commands (1322B).

Through the use of separate command nodes, multiple commands can be transmitted to a mobile device substantially simultaneously. In some implementations, if multiple commands are received in a command collection topic, server time stamps can be compared to determine an order of execution. In some other implementations, an order of command execution can be determined based on command type. For example, if a wipe command is received in conjunction with one or more other remote commands, the wipe command can be performed last.

Through the notification service, a publisher, such as a remote management application, can publish a remote command message to a command collection topic that is associated with a particular mobile device. When a remote command message is published to the command collection topic, a notification message can be transmitted to the subscribing mobile device. The mobile device can then access the subscribed topic and retrieve one or more published messages. Thus, communication between the publisher and the mobile device can be decoupled. Further, the remote command message can be published to the appropriate command node of the command collection topic. Additionally, a mobile device receiving a remote command message can publish a response to a result topic hosted by the notification service. A publisher, such as a remote management application, can subscribe to the result topic and can receive any published response messages.

Further, the computing environment 100 can include one or more mobile devices, such as a mobile telephone 120, a digital media player 125, and a laptop computer 130. Each of the mobile devices included in the computing environment 100 can include a network interface configured to establish a connection to the communication network 105. For example, the mobile telephone 120 can establish a cellular (e.g., 3G or 4G) network connection that provides data access to the communication network 105. Further, the digital media player 125 can establish an IEEE 802.11 (i.e., Wi-Fi or WLAN) network connection to the communication network 105. Also, the laptop computer 130 can be configured to establish a connection to the communication network 105 based on either or both of the IEEE 802.16 (i.e., wireless broadband or WiBB) and the IEEE 802.11 standards.

Each of the mobile devices 120, 125, and 130 also can be configured to communicate with the notification service application hosted by the application server 115 to publish and receive messages. Further, each of the mobile devices 120, 125, and 130 can be configured to execute a remote management application or a remote management function responsive to a remote command received through the notification service application. In some implementations, the remote management application can be integrated with the operating system of the mobile device.

A mobile device can execute a remote command to perform one or more associated functions. For example, the remote commands can include locate commands, message commands, sound commands, directory listing commands, file retrieval commands, and wipe commands. Some remote commands can be used to output a notification from a mobile device. For example, a sound command can cause a mobile device to output an auditory alert. Further, a message command can be used to present a text-based message on the display of a mobile device. Some other remote commands can be used to perform file-based functions. For example, a wipe command can be used to delete one or more items of data stored on the mobile device. A directory listing command can cause a mobile device to return data identifying all, or a portion of, the file directory structure associated with the storage of the mobile device. Additionally, a file retrieval command can be used to retrieve a copy of one or more files from a mobile device. Still other remote commands can be used to monitor a mobile device. For example, a locate command can cause a mobile device to transmit a message indicating its location at the time the locate command is executed. Further, a usage command can cause a mobile device to transmit a message identifying usage data for a period of time, such as calls placed or received. The period of time can be predetermined or can be specified in the usage command.

Additionally, each of the mobile devices 120, 125, and 130 can include an input interface through which one or more inputs can be received. For example, the input interface can include one or more of a keyboard, a mouse, a joystick, a trackball, a touch pad, a keypad, a touch screen, a scroll wheel, general and special purpose buttons, a stylus, and a microphone. Each of the mobile devices 120, 125, and 130 also can include an output interface through which output can be presented, including one or more of a display, one or more speakers, and a haptic interface. Further, a location interface, such as a Global Positioning System (GPS) processor, also can be included in one or more of the mobile devices 120, 125, and 130 to provide location information, e.g., an indication of current location. In some implementations, general or special purpose processors included in one or more of the mobile devices 120, 125, and 130 can be configured to perform location estimation, such as through base station triangulation.

Figure 2:
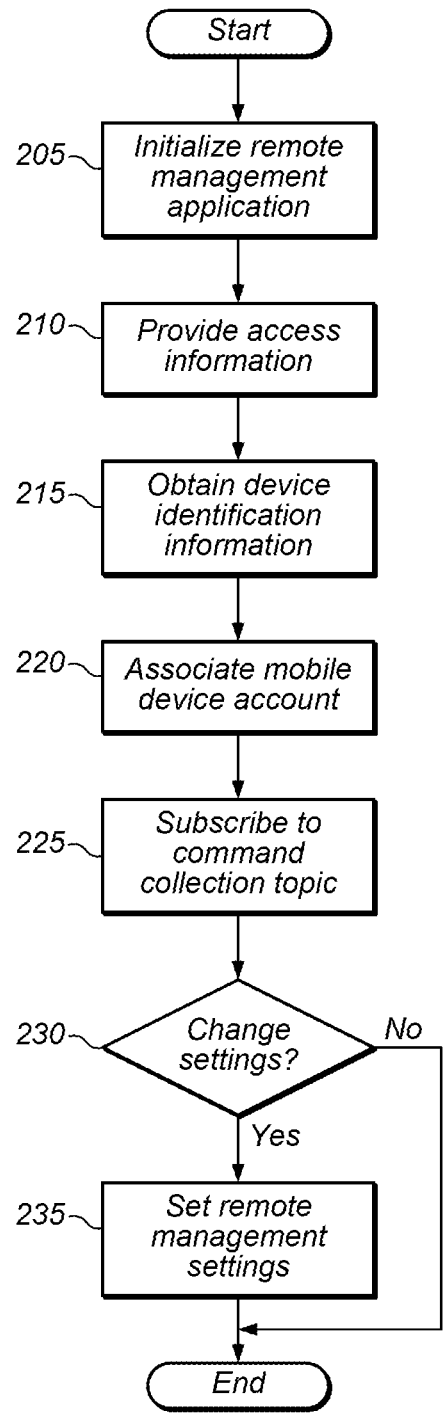
FIG. 2 shows a flow diagram describing an exemplary process for linking a mobile device with a remote management account.

FIG. 2 shows a flow diagram describing an exemplary process for linking a mobile device with a remote management account. A mobile device can be linked with any remote management account to which the mobile device owner has access. In some implementations, a mobile device can be linked with only one remote management account at a time. Thus, in order to establish a link between a mobile device and a remote management account, any previous link with a different remote management account must be broken. Alternatively, the act of linking a mobile device with a remote management account can cause any previous link with a different remote management account to be broken. In some implementations, a link between a mobile device and a corresponding remote management account also can be broken without establishing a link with a new remote management account. For example, if a mobile device is being sold or otherwise transferred to a new owner, the link between the mobile device and the existing remote management account can be broken. The mobile device subsequently can be linked to a remote management account associated with the new owner. However, a mobile device cannot be remotely managed when it is not linked with a remote management account.

In order to establish a link with a remote management account, a remote management application can be initialized on the mobile device (205). A remote management application can be included on the mobile device as part of the operating system or as a preinstalled application. Alternatively, the remote management application can be downloaded and installed by a user. Once initialized, the remote management application can cause the mobile device to establish a connection to a corresponding remote management server.

Access information can be provided to the remote management server to identify the remote management account to which the mobile device is to be linked (210). For example, a username and password corresponding to a remote management account can be entered, such as in response to a prompt by the server. The username and password can uniquely identify a remote management account hosted by the remote management server. Any unique identifier can be used to indicate a specific remote management account hosted by the remote management server.

Information uniquely identifying the mobile device further can be obtained by the remote management server (215). In some implementations, a serial number, a telephone number, a Subscriber Identity Module (SIM) card, a Media Access Control (MAC) address, an International Mobile Equipment Identity (IMEI), or other such identifier can be used to identify the mobile device. In some other implementations, the information identifying the mobile device can be a unique device identifier (UDID), which can be a hash, e.g. generated using a Secure Hash Algorithm, of hardware identifiers associated with the mobile device. Further, the unique identifier can be obtained from the mobile device automatically. Thus, data entry errors can be avoided. Once identified, the mobile device can be associated with the remote management account (220).

Further, the mobile device can subscribe to a command collection topic (225). The command collection topic can be specific to the mobile device, such that only messages intended for the mobile device are published to the command collection topic. Also, access to the command collection topic can be granted only to the mobile device, which can authenticate with the notification service based on the previously determined unique identifier. In some implementations, the notification service can be hosted on the remote management server.

In other implementations, the notification service can be hosted on one or more servers separate from the remote management server. When the mobile device subscribes to the command collection topic, one or more command nodes (or child nodes) can be created to receive messages published by the notification service. For example, the command collection topic can include a command node for each type of remote command message that the mobile device can receive, such as locate commands, sound commands, message commands, screen lock commands, directory listing commands, file retrieval commands, and wipe commands.

Additionally, it can be determined whether one or more remote management settings associated with the mobile device are to be changed (230). The remote management functions associated with the mobile device initially can be configured in accordance with default settings. For example, one or more of the remote management commands, such as the wipe and sound commands, can be enabled by default, while one or more other remote management commands, such as the locate command, can be disabled by default. A remote management command will not be executed by the mobile device unless it has been enabled. Accordingly, the mobile device owner's privacy can be protected in the default mobile device configuration because location information cannot be remotely obtained from the mobile device. Further, in some implementations, one or more of the remote management commands, e.g. the message command, can be permanently enabled, such that a mobile device owner cannot disable the command.

At the time the mobile device is associated with a remote management account, the mobile device owner can be prompted to review the remote command settings. If the mobile device owner elects not to change the remote command settings, the initialization process can be terminated. Alternatively, if the mobile device owner elects to change the remote command settings, the current remote command settings can be displayed so that the mobile device owner can alter one or more of the remote management settings (235). For example, the mobile device owner can provide input to enable the locate command so that the mobile device can be remotely located.

In some implementations, the remote command settings can be accessed at any time through an operating system menu item, such as preferences or contacts. Alternatively or additionally, the remote command settings can be accessed through the remote management application. Once the remote command settings have been set, the initialization process can be terminated.

Figure 3:
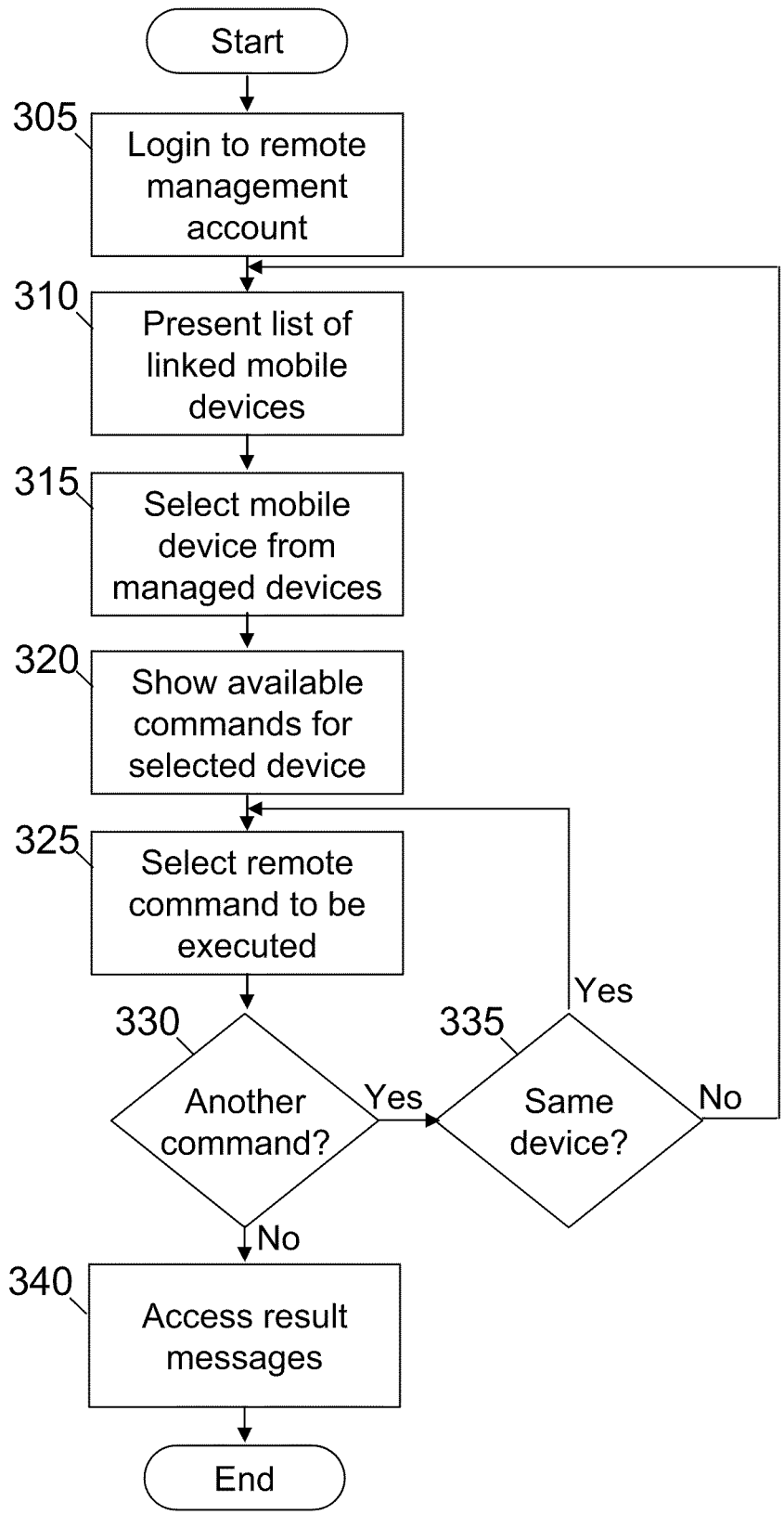
FIG. 3 shows a flow diagram describing an exemplary process for remotely commanding a mobile device.

FIG. 3 shows a flow diagram describing an exemplary process for remotely commanding a mobile device. A remote management application can be configured to remotely command one or more linked mobile devices by publishing remote command messages to a notification service. In some implementations, the remote management application can be a web-based application hosted on one or more servers.

A remote management account owner can login to a remote management account by accessing the remote management application and providing login credentials, such as a username and password (305). A remote management account can be established through a registration process at any time, even if no mobile devices are being linked with the account. In some implementations, the login process can be secured, such as by encrypting one or more items of login information or by establishing a secured connection. Further, in some implementations, additional or different login credentials can be required in order to access a remote management account.

Once access to a remote management account has been granted, a list of mobile devices linked with the remote management account can be presented (310). The list of mobile devices identifies each of the managed devices associated with the remote management account. Each mobile device can be uniquely identified through one or more items of information, including one or more of an icon identifying the device, a device type, a model, a serial number, a telephone number, and a nickname. Further, the list of mobile devices also can indicate, for each device, whether the device is currently reachable or online. If a mobile device associated with the account has been wiped, the mobile device can be displayed in the list of mobile devices with an indication that the device can no longer be managed. In some implementations, a mobile device also can be associated with a remote management account through the account interface, such as during account registration.

A mobile device can be selected from the list of managed devices (315). For example, the account owner can select a mobile device that has been misplaced. The mobile device can be selected by clicking on a corresponding icon or item of information included in the list of managed devices. One or more remote commands available for the selected mobile device also can be presented (320). In some implementations, all remote commands can be presented along with indicators identifying which remote commands have been enabled for the mobile device. In some other implementations, only the remote commands that have been enable are presented. Further, in some implementations, one or more remote commands also can be enabled at the account level, i.e. through the remote management account, for execution on a mobile device. For example, the mobile device and remote management application can be configured to permit one or more remote commands to be enabled through the remote management account if additional authentication information can be verified. Additionally, one or more remote commands, e.g. the locate command, can be enabled only at the device level, i.e. from the mobile device. Thus, the privacy of the mobile device owner can be safeguarded.

A remote command to be executed by the mobile device can be selected from the available remote commands (325). Based on the remote command selected, the remote management application can prompt the account owner for one or more items of information. For example, if the message command is selected, the remote management application can prompt the account owner to provide a message to be displayed on the mobile device. Alternatively, if the wipe command is selected, the remote management application can prompt the account owner to confirm that a wipe command is to be sent to the mobile device. Other remote commands can be initiated upon selection, without prompting the account owner for additional information. For example, the locate command can be initiated in response to its selection.

The remote management application can generate and transmit the selected remote command to the notification service. For example, the remote management application can have an Extensible Messaging and Presence Protocol (XMPP) connection to the notification service and can send a publish message to the corresponding command node of the command collection topic associated with the mobile device. The notification service can publish the remote command and send a notification message to the mobile device subscribing to the command collection topic.

After a remote command has been initiated, it can be determined whether another command is to be generated (330). Any number of commands can be sent to a mobile device. For example, a message command can be sent to present a message on the display of the mobile device and a sound command can be sent to provide an audible alert so that the mobile device may be noticed. However, after a wipe command has been executed, no additional commands can be sent to a mobile device until it has been reconfigured. If another command is to be generated, it further can be determined whether the command is intended for the same mobile device (335). If another command is to be generated for the same mobile device, the remote command can be selected from the available remote commands for that mobile device (325). Alternately, if the next command is intended for a different mobile device, the list of mobile devices associated with the remote management account can be presented (310).

If another command is not desired, any result messages associated with the remote management account can be accessed (340). A mobile device receiving a remote command can publish a result message indicating that the command is being executed and providing any information requested by the command. Further, the remote management account can specify a result topic with the remote command to which the mobile device is to publish the result message. If the mobile device is connected to a data network when the remote command message is published, the corresponding result message can be published by the mobile device to the result topic in real-time or near real-time. Alternatively, if the mobile device is powered off or not connected to a data network when the remote command message is published, a result message will not be published until after the mobile device establishes a connection to a data network and retrieves the remote command for execution.

Figure 4:
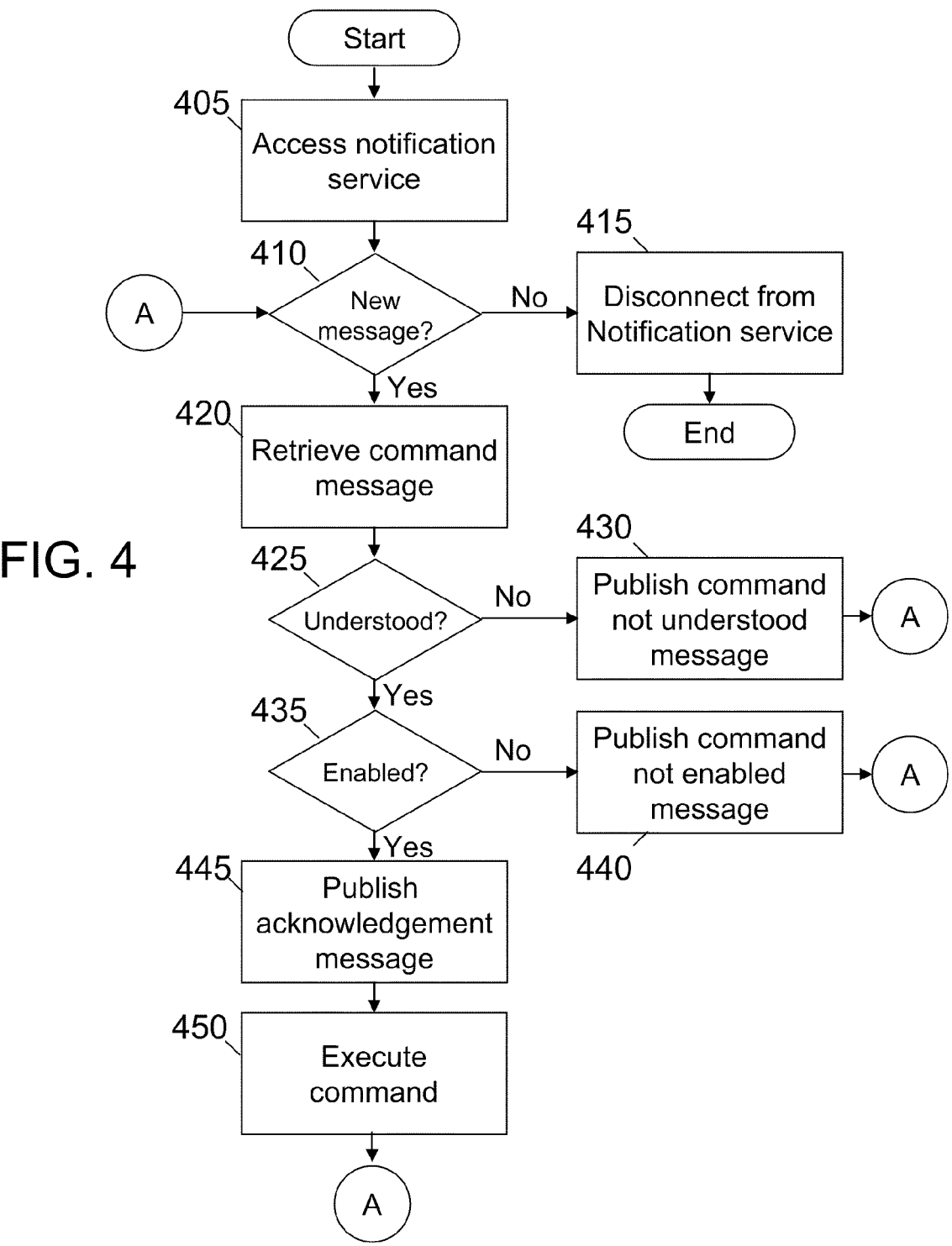
FIG. 4 shows a flow diagram describing an exemplary process for receiving a remote command by a mobile device.

FIG. 4 shows a flow diagram describing an exemplary processes for receiving a remote command by a mobile device. Some mobile devices, such as mobile telephones, can have a persistent wireless network connection, such as a (TCP) connection, whenever they are powered on and in a service area. Some other mobile devices, such as digital media players, can have a wireless network connection only when they are within range of an access point, such as a Wi-Fi base station, and the wireless network connection has been enabled. Further, push services for a mobile device can be turned off, e.g. to preserve battery life. Thus, a mobile device can be configured to establish a network connection at a predetermined interval, such as every thirty minutes, to receive remote management commands. Additionally, in the event a mobile device is configured to establish a network connection only in response to a manual command, the mobile device nonetheless can be configured to automatically establish a network connection in support of remote management. For example, a network connection can be established once an hour to check for remote command messages and then torn down. Thus, if the mobile device is lost and a network connection cannot be manually triggered, it is still possible for one or more remote management commands to be received by the mobile device.

A mobile device can access a notification service hosting a command collection topic to which the mobile device subscribes (405). For example, the mobile device can access a URI associated with the notification service and can perform an authentication process. Once authenticated, the mobile device can access a subscribed command collection topic. The command collection topic can be uniquely associated with the mobile device and can include one or more command nodes, each of which can receive a particular type of command message. The mobile device can be configured to access the notification service upon reestablishing a data network connection, such as when the mobile device is first powered on in an area in which data network access is available. Additionally, the mobile device can be configured to access the notification service in response to receiving a notification that a message has been published to a subscribed command topic.

Once the mobile device has accessed the command collection topic, each of the command nodes included in the topic can be polled to determine whether one or more new remote command messages have been received (410). In some implementations, the mobile device can be configured to compare any remote command messages included in the command collection topic to remote command messages cached by the mobile device. If a remote command message does not exist in the cache, the mobile device can treat the message as new. If no new remote command messages have been received, the mobile device can disconnect from the notification service (415).

Alternatively, if a new remote command message is detected in the command collection topic, the mobile device can retrieve the new remote command message (420). In some implementations, if more than one new remote command message exists in the command collection topic, the remote command messages can be retrieved in order based on server time stamps, command message type, or a combination thereof. For example, the mobile device can be configured to retrieve a wipe command last, as execution of the wipe command will preclude the execution of any remaining commands.

The remote command message can include general parameters to be used in executing the command and response, such as a server time stamp, a result topic to which a result message is to be published, and a command identifier. One or more command specific parameters also can be included for a particular command type. For example, a message command can include parameters identifying the message to be displayed. The parameters can be expressed using any data construct, including a delineated list, data fields, or key-value pairs. In some implementations, the server time stamp can be an XMPP standard time stamp in the format yyyy-MM-dd'T'HH:mm:ss.SSS'Z. Further, the server time stamp can be used to calculate the duration between transmission of the remote command message and execution of the associated command.

The mobile device can evaluate a retrieved remote command message to determine whether the associated command is understood (425). For example, a mobile device may not understand a command that is associated with a more recent version of an operating system or that requires functionality not included in the mobile device. If the mobile device does not understand the command associated with the retrieved remote command message, the mobile device can publish a message to a result topic indicating that the command was not understood (430). The result topic can be a predetermined result topic associated with the mobile device or a result topic identified in the remote command message. The mobile device further can determine whether the command collection topic includes a new command message (410).

If the command associated with the retrieved remote command message is understood, the mobile device can determine whether the command also is enabled (435). For example, one or more of the commands that can be executed by a mobile device can be disabled, either through user action or in accordance with default settings. If the command has been disabled, the mobile device can publish a message to the result topic indicating that the command has been disabled (440). The mobile device further can determine whether the command collection topic includes a new command message (410).

If the mobile device determines that the command is enabled, the mobile device can publish an acknowledgement message to the result topic (445). The result topic can be specified in the command message or can be a predetermined result topic. The acknowledgement message can indicate the result of the command and the time at which command execution was initiated. Also, the acknowledgement message can be published before command execution for some commands, such as the wipe command, the sound command, and the message command, to indicate that the command will be executed. For other commands, such as the location command, the acknowledgement message can be published after the command has been executed. For example, the acknowledgement message corresponding to the location command includes data generated during command execution that identifies the location of the mobile device.

The mobile device also can execute the command identified by the remote command message (450). For example, the sound command can be executed by outputting an audible alert, such as one or more sounds played at a specified volume for a specified duration. In some implementations, the audible alert also can be delayed, e.g. for a predetermined time after the command is transmitted, and/or repeated one or more times. The message command can be executed by outputting a message, such as text, to a display included in the mobile device. Further, execution of the wipe command can cause one or more items of data to be deleted from the mobile device. In some implementations, the type of data or level of wipe can be selected by the mobile device owner. In other implementations, executing the wipe command can cause the mobile device to be restored to a default state. Additionally, execution of the locate command can cause the mobile device to identify its location, based on the geographic reference information available to the mobile device at the time the command is executed. Except in the case of a wipe command, after the command has been executed the mobile device can determine whether another new message exists in the command collection topic (410).

Figure 5:
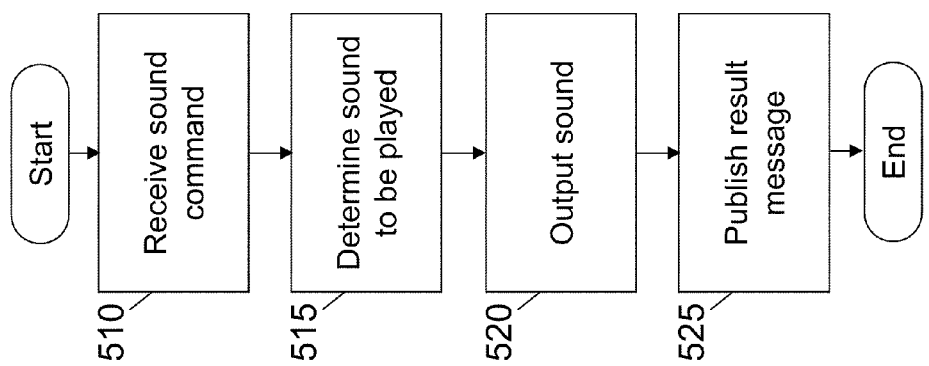
FIGS. 5-8 show flow diagrams describing exemplary processes for executing remote commands by a mobile device.

FIG. 5 shows a flow diagram describing an exemplary process for executing a sound command by a mobile device. The mobile device can receive a sound command indicating that an audible alert is to be output (510). As described above, a remote command message corresponding to the sound command can be retrieved from a sound command node of a command collection topic subscribed to by the mobile device. Further, the mobile device can determine that the sound command is both recognized and enabled on the mobile device. If the mobile device determines that the sound command is not recognized or is not enabled, the command is ignored.

In response to the sound command, the mobile device can determine the sound to be played (515). In some implementations, the sound command can indicate that a predetermined audible alert is to be played. The predetermined audible alert can be characterized by one or more predetermined sounds and a predetermined duration. In some other implementations, the sound command can include one or more parameters specifying characteristics of the audible alert, such as one or more sounds to be played, a volume, a duration, whether the audible alert is to be repeated, and whether the audible alert is to be output continuously or periodically.

The one or more sounds representing the audible alert can then be output by the mobile device (520). Further, the mobile device can publish a result message to the notification service (525). The result message can be published to a result topic, e.g. a result topic specified by the command message, indicating that the audible alert has been or will be output. In some implementations, the result message can include one or more items of data, such as the time at which the command was executed and the characteristics of the audible alert.

Figure 6:
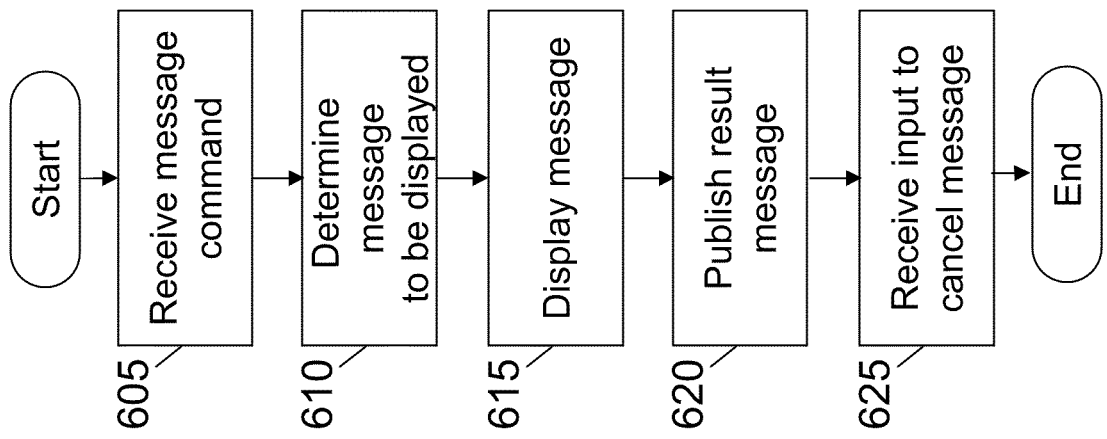

FIG. 6 shows a flow diagram describing an exemplary process for executing a message command by a mobile device. The mobile device can receive a message command indicating that a message is to be presented on a display of the mobile device (605). For example, the message can indicate contact information that can be used to coordinate the return of the mobile device. As described above, a remote command message corresponding to the message command can be retrieved from a message command node of a command collection topic subscribed to by the mobile device. Further, the mobile device can determine that the message command is both recognized and enabled on the mobile device. If the mobile device determines that the message command is not recognized or is not enabled, the command is ignored.

The mobile device can determine the message to be displayed (610). For example, the received message command can include the text of the message to be presented. In some implementations, the message command also can specify the message format, including one or more of font, font size, text color, background, and graphics. Further, one or more restrictions can be placed on the message, such as the number of characters or message size, to ensure that the message can be displayed in its entirety on a single screen and to reduce the overhead associated with the message command. The message identified by the message command can be presented on the display of the mobile device (615). The message can be displayed above all other items presented on the display, such that the entire message is visible and uninterrupted. Further, the message can be displayed even if the mobile device is locked or if a screensaver is active.

The mobile device also can publish a result message to a result topic associated with the notification service (620). For example, a result topic can be specified by the message command. The result message can indicate that the message was displayed on the mobile device and the time at which the message was displayed. Further, the result message also can echo back the message that was displayed on the mobile device. After the message is displayed, input can be received by the mobile device to cancel the message (625). For example, when the mobile device is found, the message can be turned off in response to an action, such as a button push.

Figure 7:
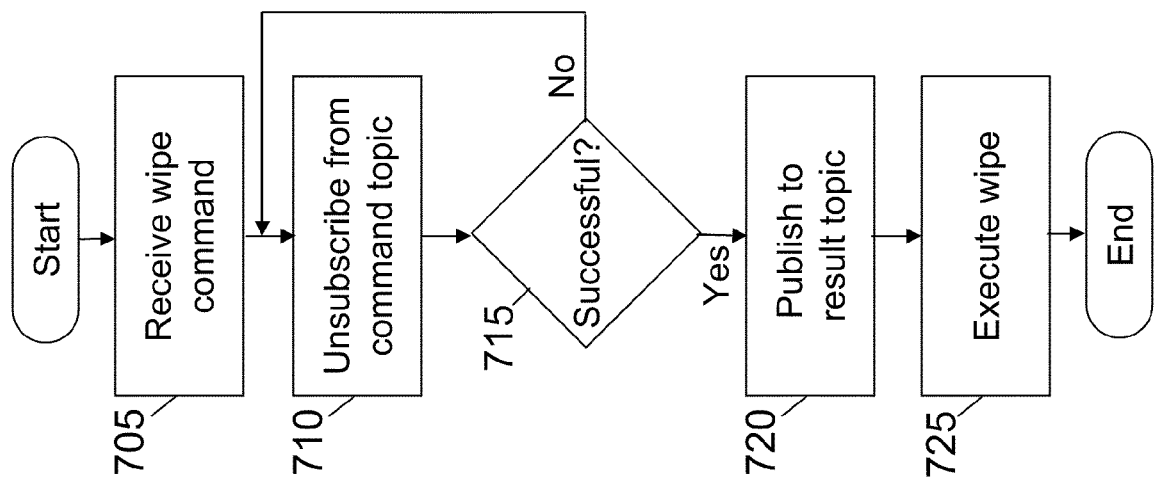

FIG. 7 shows a flow diagram describing an exemplary process for executing a wipe command by a mobile device. The mobile device can receive a wipe command indicating that one or more items of data are to be deleted from the mobile device (705). As described above, a remote command message including the wipe command can be retrieved from a wipe command node of a command collection topic subscribed to by the mobile device. Further, the mobile device can determine that the wipe command is both recognized and enabled on the mobile device. If the mobile device determines that the wipe command is not recognized or is not enabled, the command is ignored.

In response to the wipe command, the mobile device can request to unsubscribe from the command collection topic (710). As a result of unsubscribing, all of the messages in the command nodes corresponding to the command collection topic can be deleted. In some implementations, the mobile device also can be removed from the device listing of the remote management account. In some other implementations, the mobile device can be presented in the device listing as no longer being able to be managed (or as a dead device). The mobile device can determine whether the attempt to unsubscribe from the command collection topic was successful (715). If the mobile device did not successfully unsubscribe from the command collection topic, the mobile device can repeat the request to unsubscribe (710).

If the mobile device successfully unsubscribed from the command collection topic, the mobile device can publish a response to the result topic (720). The response can indicate that the wipe process has been initiated. Further, the response also can indicate when the wipe process was initiated. In some implementations, an electronic mail (email) message also can be generated by the remote management application to indicate that the wipe process has been initiated. For example, an email message announcing the wipe procedure can be addressed to an email account associated with the remote management account owner. Once the response has been published, the mobile device can execute the wipe command (725).

In some implementations, the level of wipe to be performed can be specified in the wipe command. For example, the mobile device can be wiped to return it to the original factory settings and to delete all user data. In one alternative, the mobile device can be wiped to render it inert, such that system data must be restored before the mobile device is once again functional. In another alternative, the wipe command can specify one or more types of data to be wiped, such as electronic mail messages, images, and contacts. Any number of categories can be specified for deletion using a custom wipe command. Once the wipe procedure has been performed, the mobile device is no longer subscribed to the command collection topic and thus cannot receive any additional remote commands.

Figure 8:
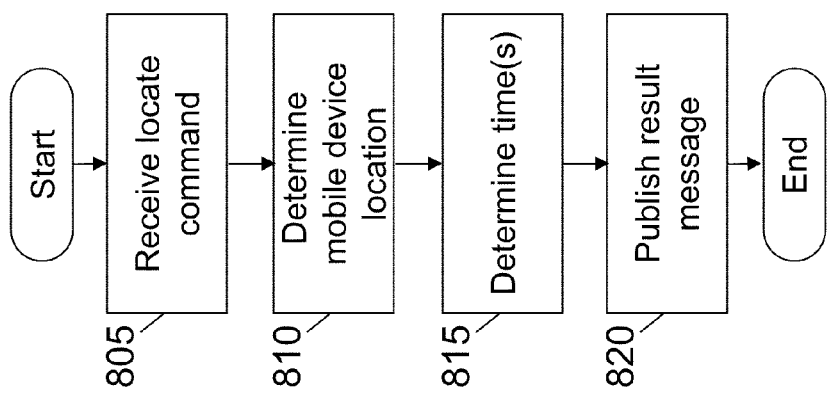

FIG. 8 shows a flow diagram describing an exemplary process for executing a locate command by a mobile device. The mobile device can receive a locate command requesting the present location of the mobile device (805). As described above, a remote command message including the locate command can be retrieved from a locate command node of a command collection topic subscribed to by the mobile device. Further, the mobile device can determine that the locate command is both recognized and enabled on the mobile device. If the mobile device determines that the locate command is not recognized or is not enabled, the command is ignored.

In response to receiving the locate command, the mobile device can determine its present location (810). For example, the mobile device can use a location process or application programming interface (API) to retrieve the available data that most accurately describes its location. If the mobile device includes a Global Positioning System (GPS) chip, the mobile device can retrieve the GPS coordinates identifying its present location. If the mobile device does not include a GPS chip, or if GPS coordinates are not available, the mobile device can determine its location through other means. For example, if the mobile device is configured to communicate on a wireless telecommunications network, the mobile device can estimate its location using cellular tower triangulation. Alternatively, if the mobile device is configured to communicate using a Wi-Fi connection, the mobile device can estimate its location in accordance the nearest Wi-Fi base station. The mobile device also can use any other technique known in the art for determining or estimating its location.

The mobile device also can be configured to determine one or more times associated with the locate command (815). For example, the mobile device can determine the time at which the locate command was received. Further, the mobile device can determine the time at which the locate command was processed to determine the location information.

Once the mobile device has determined the location information, the mobile device can publish a result message to the result topic (820). The result message can include one or more items of location data. For example, the result message can include key-value pairs specifying geographic data, such as longitude, latitude, vertical accuracy, and horizontal accuracy. Further, the result message can include one or more items of time data. For example, the result message can include a time stamp indicating the time at which the location data was retrieved and a time stamp indicating the time at which the locate message was received. Accordingly, the accuracy of the location data can be at least partially assessed based on the reported time data.

Figure 9:
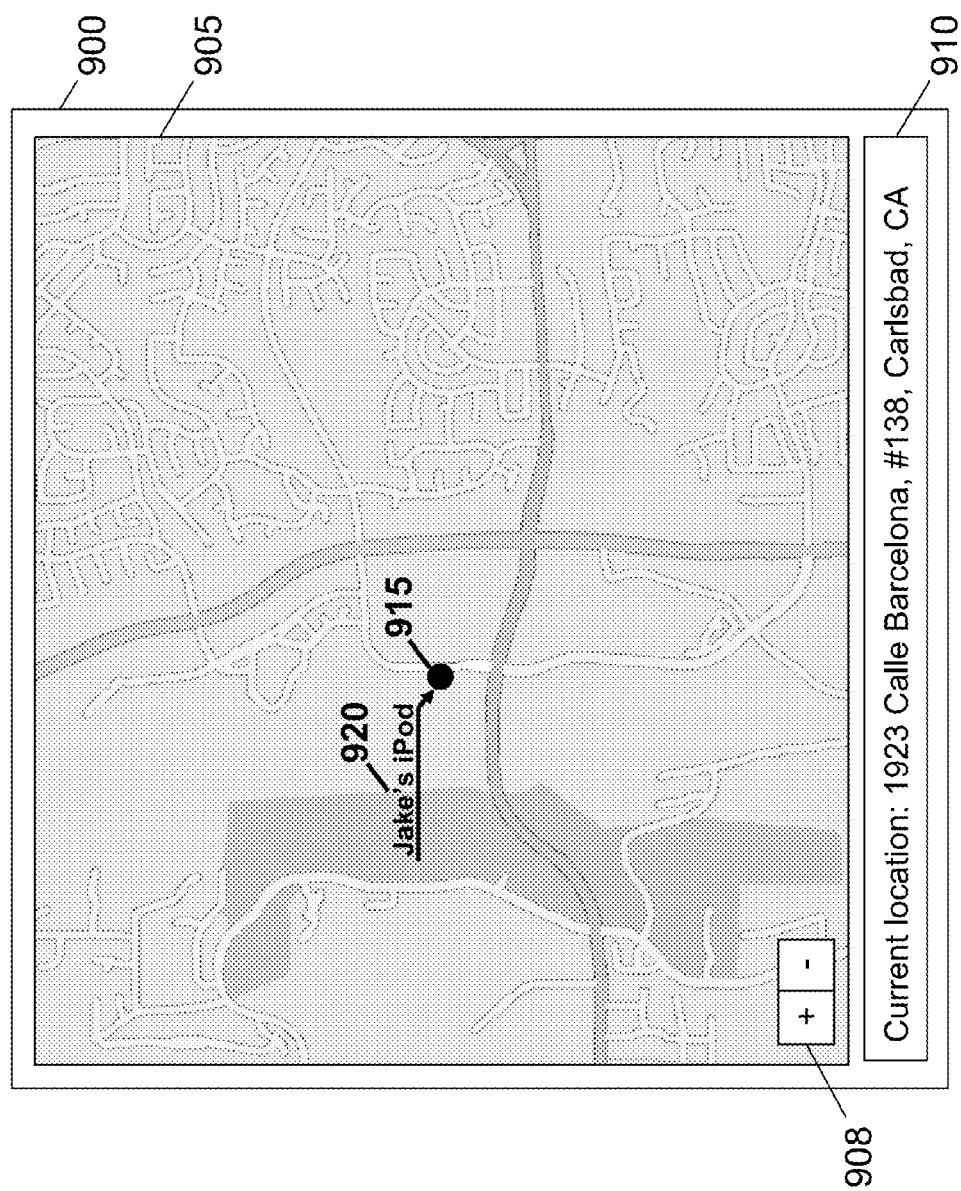
FIGS. 9-10 show exemplary user interfaces depicting the location reported by a mobile device in response to a locate command.

FIG. 9 shows an exemplary user interface depicting the location reported by a mobile device in response to a locate command. The user interface 900 can be configured for presentation on any display device, including a display associated with a mobile device. A map 905 can be presented in the user interface 900, depicting a region that includes the location reported by the mobile device in response to a locate command. In some implementations, the map 905 can be interactive and can include a resolution control 908 for receiving input to increase or decrease the scale of the map 905.

The user interface 900 also can include an address field 910 that displays an address corresponding to the location reported by the mobile device. The address most closely corresponding to the reported location of the mobile device can be selected. For example, if the location reported by the mobile device is outside of an existing address, such as in a parking lot or greenbelt, the nearest available address to that location can be presented. A location indicator 915 also can be presented on the map 905 in the position corresponding to the location reported by the mobile device. Further, a legend 920 can be displayed in conjunction with the location indictor 915. In some implementations, the legend 920 can identify the mobile device reporting the displayed location. In some other implementations, the legend 920 can indicate a geographic reference, such as the street address, location name, or geographic coordinates of the reported location.

Figure 10:
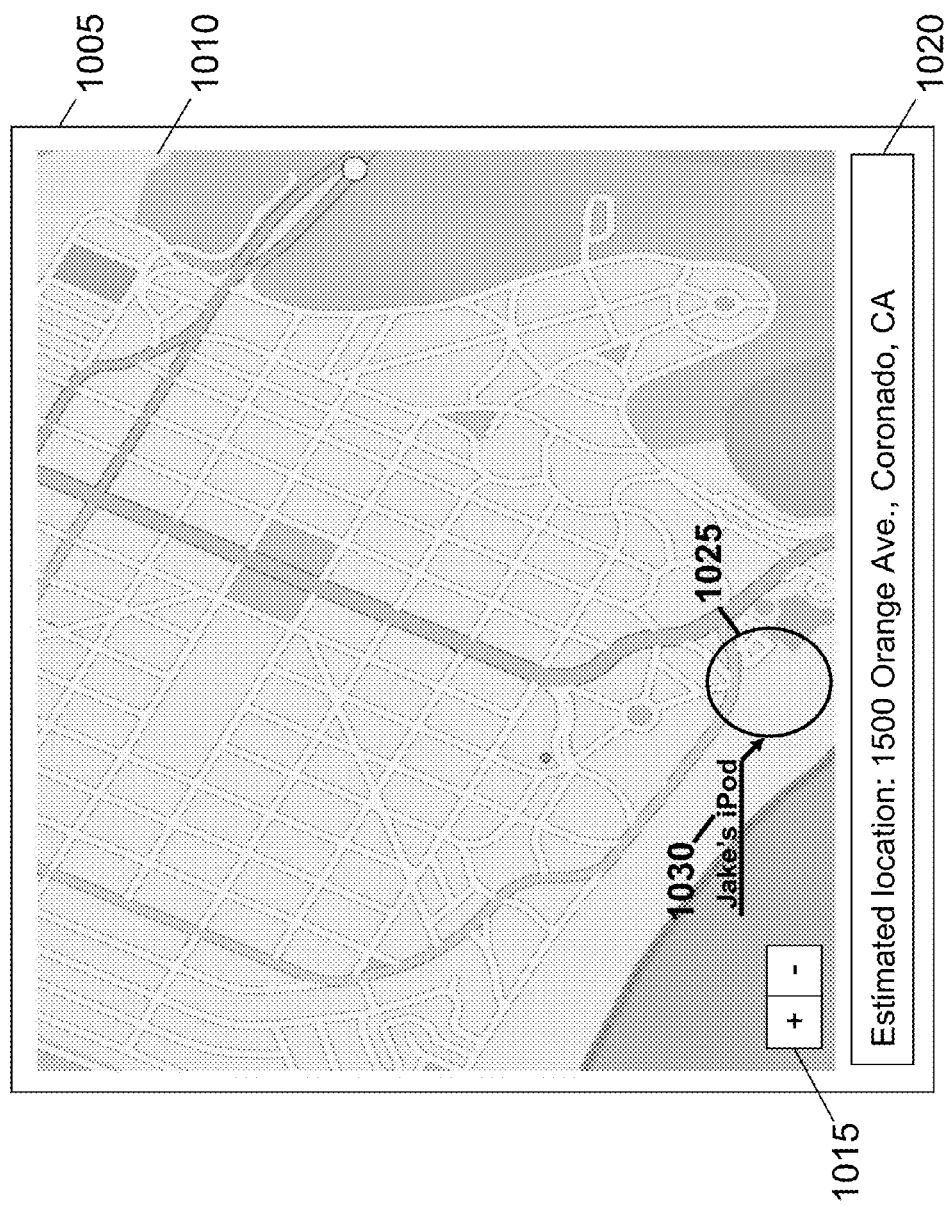

FIG. 10 shows an exemplary user interface depicting an estimated location of a mobile device based on a response to a locate command. The user interface 1005 can be configured for presentation on any display device, including a display associated with a mobile device. A map 1010 can be presented in the user interface 1005, depicting a region that includes the estimated location of the mobile device. In some implementations, the map 1010 can be interactive and can include a resolution control 1015 for receiving input to increase or decrease the scale of the map 1010.

The user interface 1005 also can include an address field 1020 that displays an address corresponding to the estimated location of the mobile device. The address most closely corresponding to the estimated location of the mobile device can be selected. For example, if the estimated location is based on a Wi-Fi base station, the address associated with the Wi-Fi base station can be included in the address field 1020. A location indicator 1025 also can be presented on the map 1010. The location indicator 1025 can be centered on the estimated position, such as the location of the associated Wi-Fi base station. The location indicator 1025 also can be sized to approximate the area in which the mobile device can be located, such as in accordance with the approximate effective range of the associated Wi-Fi base station. Further, a legend 1030 can be displayed in conjunction with the location indictor 1025. In some implementations, the legend 1030 can identify the mobile device reporting the estimated location. In some other implementations, the legend 1030 can indicate a geographic reference, such as an address, a location name, or the geographic coordinates corresponding to the estimated location.

Figure 11:
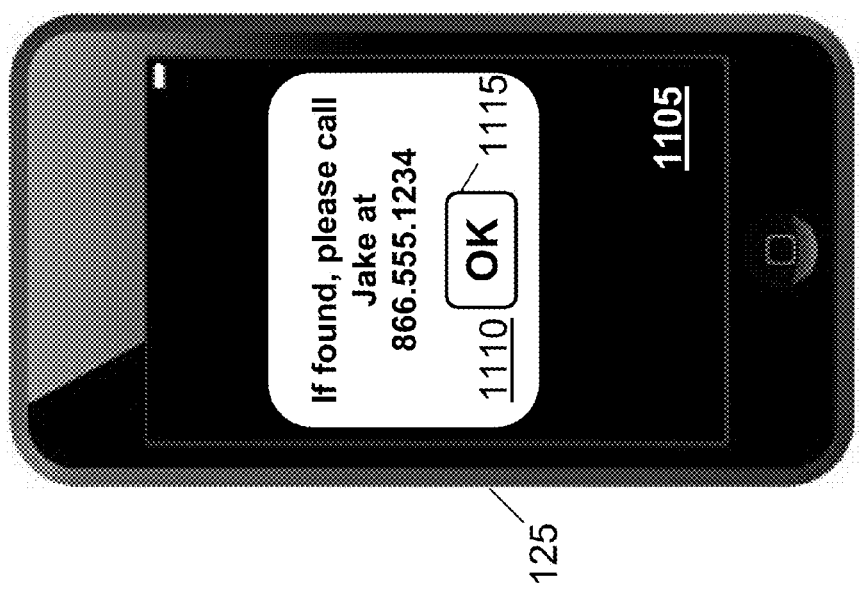
FIG. 11 shows a mobile device displaying an exemplary message in response to a message command.

FIG. 11 shows a mobile device displaying an exemplary message in response to a message command. The digital media player 125 includes a display 1105, such as a touch screen. In response to receiving a remote command to display a message, the digital media player 125 can present a message window 1110 on the display 1105. The message window 1110 can include a text message, such as contact information identifying the owner of the digital media player 125. For example, the remote command sent to the digital media player 125 can include a text message, such as "If found, please call Jake at 866.555.1234." In some implementations, the message window 1110 can include one or more images, graphics, effects, or links. The one or more images, graphics, effects, or links can be content transmitted in conjunction with the message command, content retrieved by the digital media player 125, or content stored on the digital media player 125. The message window 1110 can be presented using any arrangement of colors and fonts. Further, the message window 1110 can include an action button 1115 to permit closing the message window 1110. In some implementations, the message window 1110 can be persistently displayed until the action button 1115 is actuated or other input canceling presentation of the message is received. Additionally, the message window 1110 can be displayed above any other screen content, such that it is viewable even if the mobile device is locked or displaying a screen saver.

Figure 12:
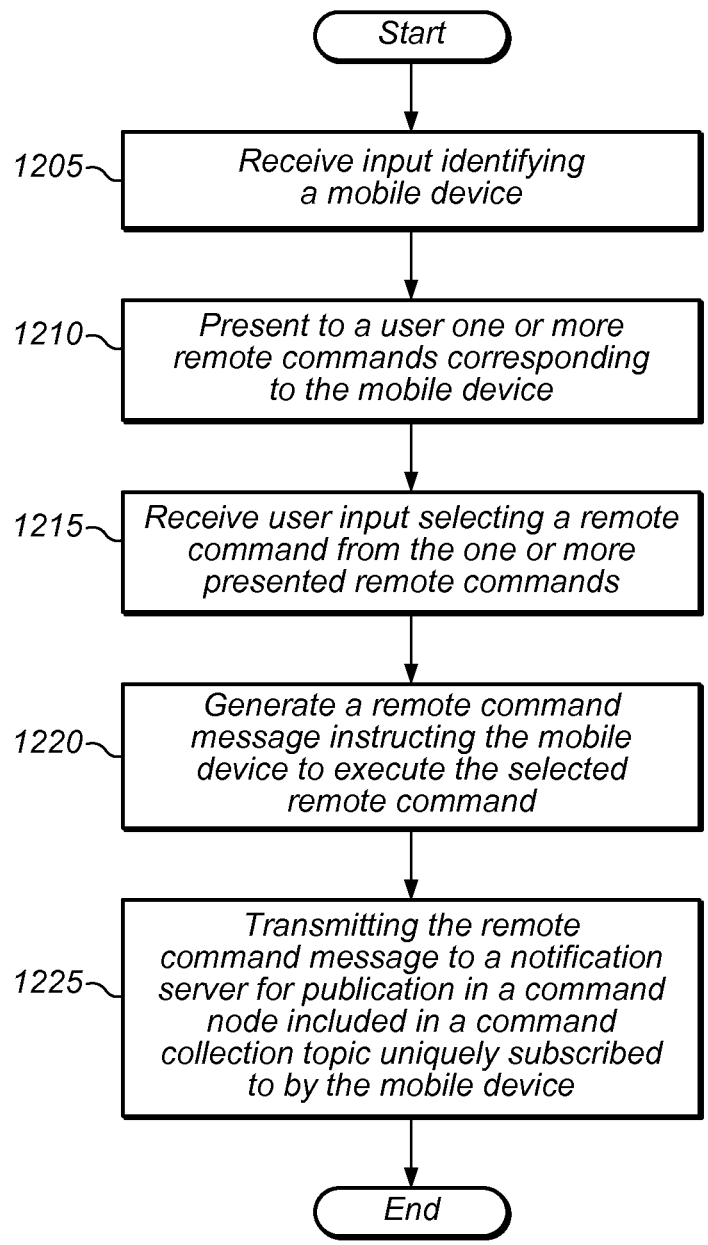
FIG. 12 shows a flow diagram describing an exemplary process for remotely commanding a mobile device.

FIG. 12 shows a flow diagram describing an exemplary process for remotely commanding a mobile device. Initially, input identifying a mobile device can be received (1205). One or more remote commands corresponding to the mobile device also can be presented to a user (1210). Further, user input selecting a remote command from the one or more presented remote commands can be received (1215). Once user input selecting a remote command has been received, a remote command message can be generated instructing the mobile device to execute the selected remote command (1220). Further, the remote command message can be transmitted to a server for publication in a message topic (1225).

The techniques and functional operations described in this disclosure can be implemented in digital electronic circuitry, or in computer software, firmware, or hardware, including the structural means described in this disclosure and structural equivalents thereof, or in combinations of them. The techniques can be implemented using one or more computer program products, e.g., machine-readable instructions tangibly stored on computer-readable media, for execution by, or to control the operation of one or more programmable processors or computers. Further, programmable processors and computers can be included in or packaged as mobile devices.

The processes and logic flows described in this disclosure can be performed by one or more programmable processors executing one or more instructions to receive, manipulate, and/or output data. The processes and logic flows also can be performed by programmable logic circuitry, including one or more FPGAs (field programmable gate array), PLDs (programmable logic devices), and/or ASICs (application-specific integrated circuit). General and/or special purpose processors, including processors of any kind of digital computer, can be used to execute computer programs and other programmed instructions stored in computer-readable media, including nonvolatile memory, such as read-only memory, volatile memory, such as random access memory, or both. Additionally, data and computer programs can be received from and transferred to one or more mass storage devices, including hard drives, flash drives, and optical storage devices. Further, general and special purpose computing devices and storage devices can be interconnected through communications networks. The communications networks can include wired and wireless infrastructure. The communications networks further can be public, private, or a combination thereof.

A number of implementations have been disclosed herein. Nevertheless, it will be understood that various modifications may be made without departing from the spirit and scope of the claims. Accordingly, other implementations are within the scope of the following claims.

What is claimed is:

1. A computer-implemented method, of remotely commanding a mobile device, the method comprising:
   receiving input from a user uniquely identifying a mobile device, wherein the mobile device is remotely located from the user;
   presenting to a user one or more remote commands available to be performed by the mobile device, wherein the presenting includes identifying at least one of the one or more remote commands as enabled for execution by the mobile device;
   receiving user input selecting a remote command from the one or more presented remote commands;
   generating a remote command message instructing the mobile device to execute the selected remote command; and
   transmitting the remote command message to a notification server for publication in a command node included in a command collection topic uniquely subscribed to by the mobile device, where the command collection topic is one of a plurality of command collection topics hosted on the notification server and the command node is one of a plurality of command nodes included in the command collection topic, wherein the notification server notifies the mobile device that the remote command message is available for retrieval in the command node, and wherein the notification server transmits the remote command message to the mobile device only in response to the mobile device accessing the command node.

2. The computer-implemented method of claim 1, further comprising:
   presenting to the user a selectable list of mobile devices associated with a remote management account, the selectable list including information uniquely identifying each mobile device.

3. The computer-implemented method of claim 2, further comprising:
   indicating, for at least one mobile device included in the selectable list of mobile devices, whether the at least one mobile device is online.

4. The computer-implemented method of claim 1, further comprising:

receiving a result message confirming execution of the selected remote command by the mobile device.

5. The computer-implemented method of claim 1, wherein the remote command comprises a locate command.

6. The computer-implemented method of claim 5, further comprising:
receiving a result message including geographic coordinates corresponding to a location of the mobile device.

7. The computer-implemented method of claim 1, wherein the remote command comprises a wipe command.

8. The computer-implemented method of claim 7, further comprising:
receiving a result message confirming initiation of a wipe process by the mobile device; and
identifying the mobile device as an inactive device.

9. A computer program product, encoded on a non-transitory computer-readable medium, operable to cause data processing apparatus to perform operations comprising:
presenting to a user a list of one or more mobile devices associated with a remote management account;
receiving user input selecting a mobile device included in the list of one or more mobile devices;
presenting to the user a list of one or more remote commands available to be performed by the selected mobile device, wherein presenting the list includes identifying at least one of the one or more remote commands as enabled for execution by the selected mobile device;
receiving user input selecting a remote command from the list of one or more remote commands;
generating a remote command message identifying the selected remote command; and
transmitting the remote command message to a notification server for publication in a command node included in a command collection topic uniquely subscribed to by the selected mobile device, where the command collection topic is one of a plurality of command collection topics hosted on the notification server and the command node is one of a plurality of command nodes included in the command collection topic, wherein the notification server notifies the mobile device that the remote command message is available for retrieval in the command node, and wherein, only in response to the mobile device accessing the command node, the notification server transmits the remote command message to the mobile device.

10. The computer program product of claim 9, further operable to cause data processing apparatus to perform operations comprising:
displaying, for one or more mobile devices included in the presented list, an indication that the mobile device is online 11. The computer program product of claim 9, further operable to cause data processing apparatus to perform operations comprising:
prompting the user to provide an item of information in response to the selected remote command.

12. The computer program product of claim 11, wherein the item of information comprises a message to be displayed on the mobile device.

13. The computer program product of claim 11, wherein the item of information comprises confirmation of a wipe command.

14. The computer program product of claim 9, further operable to cause data processing apparatus to perform operations comprising:
retrieving a result message generated by the mobile device in response to the remote command from a result topic identified in the remote command message.

15. A system comprising:
a server hosting a plurality of command collection topics; and
a computing system including an input interface, a display, and processor electronics configured to perform operations comprising:
presenting, on the display, a user interface listing one or more mobile devices associated with a remote management account;
receiving, through the input interface, a user selection corresponding to one of the one or more mobile devices;
presenting, in the user interface, one or more remote commands, wherein presenting the one or more remote commands includes identifying at least one of the one or more remote commands as enabled for execution by the selected mobile device;
receiving, through the input interface, a user selection corresponding to one of the one or more remote commands; and
transmitting a remote command message corresponding to the selected remote command to the server for publication in one of a plurality of command nodes included in a command collection topic uniquely subscribed to by the selected mobile device, wherein the server notifies the mobile device that the remote command message is available for retrieval in the command node, and wherein, only in response to the mobile device accessing the command node, the server transmits the remote command message to the mobile device.

16. The system of claim 15, wherein the server is further configured to host a result topic.

17. The system of claim 16, wherein the processor electronics are further configured to perform operations comprising:
retrieving from the result topic a result message generated by the selected mobile device in response to the remote command message.

18. The system of claim 17, wherein the result message includes an execution time associated with the selected remote command.

19. The system of claim 16, wherein the processor electronics are further configured to perform operations comprising:
presenting, in the user interface, one or more disabled remote commands corresponding to the selected mobile device;
receiving, through the input interface, a user selection corresponding to one of the one or more disabled remote commands; and
transmitting a message to the selected mobile device enabling the disabled remote command for execution by the selected mobile device.

20. The system of claim 15, wherein the selected remote command comprises a locate command.

21. The system of claim 20, wherein the processor electronics are further configured to perform operations comprising:
receiving a result message corresponding to the locate command, the result message including geographic coordinates associated with the selected mobile device; and
presenting, on the display, a map depicting a location of the selected mobile device in accordance with the associated geographic coordinates.

22. A computer-implemented method of remotely commanding a mobile device, the method comprising:
- receiving input uniquely identifying a mobile device;
- presenting to a user one or more remote commands available to be performed by the mobile device;
- receiving user input selecting a remote command from the one or more presented remote commands;
- generating a remote command message instructing the mobile device to execute the selected remote command;
- transmitting the remote command message to a notification server for publication in a command node of a command collection topic uniquely subscribed to by the mobile device, where the command collection topic is one of a plurality of command collection topics hosted on the notification server and the command node is one of a plurality of command nodes included in the command collection topic;
- wherein the notification server notifies the mobile device that the remote command message is available for retrieval in the command node; and
- wherein, only in response to the mobile device accessing the command node, the notification server transmits the remote command message to the mobile device.

\* \* \* \* \*